US011407326B2

(12) United States Patent
Gaertner et al.

(10) Patent No.: US 11,407,326 B2
(45) Date of Patent: *Aug. 9, 2022

(54) CONTROLLING ELECTRIC VEHICLE CHARGING INFRASTRUCTURE

(71) Applicant: SAP SE, Walldorf (DE)

(72) Inventors: Nadine Gaertner, Speyer (DE); Oliver Frendo, Heidelberg (DE); Markus Winkler, Eppingen (DE)

(73) Assignee: SAP SE, Walldorf (DE)

( * ) Notice: Subject to any disclaimer, the term of this patent is extended or adjusted under 35 U.S.C. 154(b) by 272 days.

This patent is subject to a terminal disclaimer.

(21) Appl. No.: 16/788,514

(22) Filed: Feb. 12, 2020

(65) Prior Publication Data

US 2020/0269717 A1  Aug. 27, 2020

(30) Foreign Application Priority Data

Feb. 27, 2019  (EP) .................................. 19159738

(51) Int. Cl.
*H02J 7/00* (2006.01)
*H02J 7/14* (2006.01)
(Continued)

(52) U.S. Cl.
CPC ............ *B60L 53/68* (2019.02); *B60L 53/62* (2019.02); *B60L 53/64* (2019.02); *B60L 53/67* (2019.02); *G08G 1/20* (2013.01); *B60L 2240/72* (2013.01)

(58) Field of Classification Search
USPC ........................................................ 320/109
See application file for complete search history.

(56) References Cited

U.S. PATENT DOCUMENTS 6,941,197 B1 * 9/2005 Murakami ............ B60L 53/305
                                                    701/22
9,103,686 B2 * 8/2015 Pettersson ................. B60L 1/14
                        (Continued)

FOREIGN PATENT DOCUMENTS

EP       2894436 A2    7/2015
WO    2013/056990 A2   4/2013

OTHER PUBLICATIONS

"Communication pursuant to Article 94(3) EPC: Office Action", dated Nov. 22, 2019 (Nov. 11, 2019), European Patent Office, for European Application No. 19159738.4-1205, 6pgs.
(Continued)

*Primary Examiner* — Alexis B Pacheco
(74) *Attorney, Agent, or Firm* — Buckley, Maschoff & Talwalkar LLC

(57) ABSTRACT

A computer-implemented method, a computer system and a computer program for controlling electric vehicle charging infrastructure that is used by a plurality of electric vehicles, wherein the infrastructure comprises a plurality of charging points. The method comprises receiving schedule information for the electric vehicles, the schedule information including, for each of the electric vehicles, at least one vehicle power characteristic. The method further comprises determining at least one power constraint for each of the electric vehicles based on the vehicle power characteristic. The method further comprises receiving an arrival indication for a respective one of the electric vehicles. The method further comprises assigning the respective electric vehicle to charge at one of the charging points for at least one time interval according to the respective power constraint.

20 Claims, 11 Drawing Sheets

(51) Int. Cl.
  *B60L 53/68* (2019.01)
  *B60L 53/67* (2019.01)
  *B60L 53/62* (2019.01)
  *B60L 53/64* (2019.01)
  *G08G 1/00* (2006.01)

(56) References Cited

U.S. PATENT DOCUMENTS

| | | | |
|---|---|---|---|
| 9,581,997 B1* | 2/2017 | Penilla | B60L 53/80 |
| 2011/0127944 A1 | 6/2011 | Saito et al. | |
| 2012/0245750 A1* | 9/2012 | Paul | B60L 53/65 |
| | | | 700/291 |
| 2012/0316717 A1* | 12/2012 | Daum | B60L 53/665 |
| | | | 701/22 |
| 2013/0054045 A1* | 2/2013 | Ramezani | B60L 53/67 |
| | | | 700/297 |
| 2015/0286965 A1* | 10/2015 | Amano | B60L 53/68 |
| | | | 705/5 |
| 2019/0202315 A1* | 7/2019 | Wilding | G06Q 10/02 |
| 2019/0255963 A1* | 8/2019 | Goei | B60L 53/67 |
| 2021/0402885 A1* | 12/2021 | Boyd | H02J 7/0044 |

OTHER PUBLICATIONS

"Communication: Extended European Search Report", dated Jun. 26, 2019 (Jun. 26, 2019), European Patent Office, for European Application No. 19159738.4-1205, 9pgs.

\* cited by examiner

CONTROLLING ELECTRIC VEHICLE CHARGING INFRASTRUCTURE

CROSS-REFERENCE TO RELATED APPLICATIONS

The present application claims priority under 35 U.S.C. § 119(a) to EP Patent Application No. 19159738.4, filed Feb. 27, 2019, the contents of which are incorporated herein by reference for all purposes.

DESCRIPTION

The application relates to electric vehicles. More particularly, the application relates to controlling use of electric vehicle charging infrastructure (or charging infrastructure) that is used by a plurality of electric vehicles. The charging infrastructure may include specified or limited connection lines, charging points, and available power. Further, the charging infrastructure may be required to service various types of vehicles having different requirements.

Efficiently using charging infrastructure may be referred to as "smart charging" and may include making the most of the charging infrastructure that is available, at the lowest possible cost, while satisfying the needs of the electric vehicles. Making efficient use of charging infrastructure may be desirable not only in view of cost, but also in view of making sure that as many vehicles as possible can use the charging infrastructure without needing to upgrade or expand the charging infrastructure.

Efficient use of charging infrastructure may be quantified in components, i.e., optimization components. The components may include fair share maximization (maximizing the number of electric vehicles having at least a corresponding minimum state of charge), power (i.e., electricity) cost minimization, peak demand minimization (also referred to as peak shaving), and load imbalance minimization.

Various constraints may be considered in the context of efficient use of charging infrastructure. The constraints may be based on vehicle power characteristics. More particularly, constraints may be based on different types or models of vehicles that need to be charged, energy (e.g., battery) efficiency constraints of individual vehicles, and intraday power costs.

In some cases, electric vehicle availability may be considered. For example, some electric vehicles may need to arrive early and depart late, others may arrive late and depart early. Even when availability information is provided, uncertainties may still exist. In particular, vehicles may depart ahead of or behind schedule.

Vehicle power characteristics may describe how a vehicle can be charged, e.g., in terms of amount or phase of current or in terms of charging efficiency. Vehicle power characteristics may be specified via electric vehicle model, electric vehicle type, charging phase capability, energy efficiency of the vehicle (e.g., charging efficiency).

Use of vehicle power characteristics in controlling electric vehicle charging infrastructure may result in increased fair share (i.e., minimizing the number of electric vehicles below their minimum state of charge) and decreased energy costs.

Vehicle availability may include time based information about a vehicle, or more specifically, when the vehicle is available to be charged. Further a charging schedule may be adapted using real time information as the information arrives. In particular, when a charging schedule is determined from vehicle availability, the schedule may be adapted as vehicles arrive and depart in order to account for new information.

Uncoordinated charging of electric vehicles (e.g., charging without reference to power constraints or vehicle availability) provided in some conventional approaches can have a detrimental impact on power quality (e.g., voltage instability may arise), grid stability (e.g., power outages may be caused), energy efficiency (e.g., there may be losses in transmission or due to heat) and the load across phases (e.g., a load imbalance may arise).

Moreover, conventional approaches to controlling electric vehicle charging infrastructure might be overly pessimistic. In particular, conventional approaches may assign vehicles to charge in a way that does not efficiently use charging infrastructure, so as to compensate for unknowns regarding current or efficiency constraints for individual vehicles. In addition, conventional approaches might not take vehicle variations into account or account for the reliability of vehicle data, computation time, or the practical applicability of the charging schedule.

For example, some electric vehicles might only be able to charge using current having a specific phase (e.g., phase 1 out of three phase current). In addition, other vehicles might have particularly inefficient batteries or might have specific requirements with regard to the flow of current. In order to reflect these requirements, some conventional approaches assume that all vehicles are equivalent to the least capable vehicle to be charged. Other approaches might not consider vehicle availability. Still other conventional approaches might fail to consider the capability of some vehicles to delay or suspend charging. These approaches may lead to inefficient use of charging infrastructure or failure to maximize the number of vehicles reaching a minimum state of charge.

In some conventional approaches, the charging schedule must be manually adjusted in order to account for differences in vehicles or constraints of the electric vehicle charging infrastructure. Such constraints may include available current, load across phases, electrical safety device capability, power costs variations during the course of a day, and charging variations across vehicles that affect the electric vehicle charging infrastructure.

The manual adjustment (i.e., post processing) of the charging schedule may be needed in conventional approaches because vehicle power characteristics are not sufficiently considered or are not considered at all. More specifically, conventional approaches may require post processing of the charging schedule because power constraints, such as electric current constraints, are not considered to a sufficient extent, if at all. In addition, conventional approaches might not consider constraints dependent on the model of the electric vehicle (e.g., battery capacity), or on the electric vehicle itself (e.g., the battery efficiency), or on the electric vehicle type (e.g., plug in hybrid or battery electric) to a sufficient extent, if at all.

It may be an object of the present disclosure to address problems with conventional approaches. More particularly, aspects of the disclosure relate to the problem of ensuring that as many vehicles as possible reach a corresponding minimum state of charge (i.e., a state of charge that enables a vehicle to reach the next charging point, or return to the current one) before departing, at the lowest possible cost. In addition, once all vehicles have reached a corresponding minimum state of charge, it may be desirable to maximize the charge of all vehicles, again keeping costs as low as possible.

Moreover, aspects of the disclosure relate to the problem of controlling electric vehicle charging infrastructure more efficiently, such that power characteristics of vehicles using the infrastructure are considered. In addition, it may be desirable to reduce the time in which elements (e.g., charging points) of the electric vehicle charging infrastructure are not being used, when these elements could be used to charge vehicles.

Furthermore, aspects of the present disclosure may enable a reduction or elimination of post processing of a charging schedule such that, when the charging schedule is determined, the charging schedule may be directly applicable.

According to an aspect, a computer implemented method for controlling electric vehicle charging infrastructure is provided. The electric vehicle charging infrastructure is used by a plurality of electric vehicles and comprises a plurality of charging points. The method comprises receiving schedule information for the electric vehicles, the schedule information including, for each of the electric vehicles at least one vehicle power characteristic. The method further comprises determining at least one power constraint for each of the electric vehicles based on the vehicle power characteristic. The method further comprises receiving an arrival indication for a respective one of the electric vehicles. The method further comprises assigning the respective electric vehicle to charge at one of the charging points for at least one time interval according to the respective power constraint.

Charging the respective electric vehicle may include sending a signal to the assigned charging point (e.g., via the open charge point protocol) indicating that an electric vehicle can be charged. The charging point may then send a signal to the electric vehicle (e.g., via pulse width modulation, possibly using IEC 61850) that indicates how much current the vehicle is allowed to consume (i.e., pull or draw).

Assigning the respective electric vehicle to the charging point may include specifying an amount of current that the vehicle can draw during the time interval. If the electric vehicle (e.g., a battery management system of the electric vehicle) does not adhere to the specified amount of current (e.g., more current is drawn than what is specified), the charging point can stop the electric vehicle from charging.

In some implementations, the arrival indication may include a time and/or a charge status (i.e., current state of charge) for the electric vehicle.

Power constraints may also be referred to as electric engineering constraints. A power constraint defines at least one limitation on at least one decision variable. The power constraint may describe:
the amount and/or phase of current at a particular charging point at a particular time interval,
vehicle assignment to a charging point.

The power constraint may be an inequality relation or an equality relation (i.e., the constraint may be expressed in terms of a mathematical inequality or a mathematical equality).

The vehicle power characteristic may include (or be used to determine) at least one of the following: a vehicle model, an electric vehicle type, a maximum state of charge (i.e., charge or battery capacity) and an attribute specific to the individual vehicle, such as energy efficiency information. In some cases, the electric vehicle type and/or the charge capacity may be determined from the vehicle model.

In particular, the assigning be based on a vehicle model, which may be used to determine an electric vehicle type and/or charging capacity of an electric vehicle. In addition, the assigning may be based on electrical safety device capacity at the charging point.

In some cases, the schedule information may include vehicle availability. In such cases, it may be determined whether the arrival indication is reflected in (i.e., corresponds to) the schedule information before assigning the respective electric vehicle to charge at one of the charging points.

If the schedule information does not include vehicle availability, this may have a negative effect on optimization. Nevertheless, it would still be possible to assign the respective electric vehicle to charge at one of the charging points using one or more power constraints determined from the vehicle power characteristics.

In some implementations, schedule information may be provided by users of individual electric vehicles and may be stored in a database. Accordingly, receiving schedule information may describe a process in which users enter information in a form (e.g., a web-based form) and the received information is stored in a database for later use.

When the schedule information also includes vehicle availability, the method may further comprise determining, before receiving the arrival indication, a charging schedule for each of the electric vehicles based on the vehicle availability. The respective electric vehicle may be assigned to charge at one of the charging points for the time interval based on the charging schedule.

When the schedule information does not include vehicle availability or the arrival indication does not correspond to the vehicle availability, the method may further comprise determining whether one of the charging points is available for at least one open time interval. In addition, when one of the charging points is available, the method may further comprise assigning the respective electric vehicle to the available charging point for the open time interval.

When the schedule information does not include vehicle availability, the charging schedule may be determined as vehicles arrive.

The arrival indication may correspond to the vehicle availability when the electric vehicle arrives as scheduled or within a specified amount of time with respect to a planned arrival time. The planned arrival time may be an arrival time included in the vehicle availability. For example, the arrival indication may be reflected in the schedule information when the vehicle arrives within one time interval (e.g., 15 minutes) of the planned arrival time.

It may be determined that the arrival indication does not correspond to the vehicle availability when the vehicle is late by at least the specified amount of time. For example, the vehicle may be late by at least one time interval. Alternatively, the arrival indication might be determined to not correspond to the vehicle availability when the vehicle is late by at least a plurality of time intervals.

The open time interval may be when the charging point is not reserved. The charging point is not reserved if there is no electric vehicle currently charging at the charging point, or if the schedule information includes vehicle availability and an electric vehicle scheduled to use the charging point is late at least the specified amount of time with respect to the planned arrival time.

The availability of one of the charging points may be determined according to one or more of the optimization components mentioned above. The optimization components are discussed in more detail below.

At least one of the charging points may be part of a charging station. The charging station may include one or more of the charging points. When the charging station is present, it may be possible to interact with the charging station in order to control the charging points.

In some implementations, controlling the electric vehicle charging infrastructure may include determining which electric vehicle may charge at which charging point at which current during which time intervals. Flexibility in controlling the electric vehicle charging infrastructure may be provided through vehicle availability that exceeds required charging time and through available power that exceeds power required to bring all vehicles to a minimum state of charge. Such flexibility may enable costs to be reduced and grid stability to be increased by considering intraday power costs charged by a power provider (e.g., electric utility), load imbalance and peak demand, as discussed below. Optimizations may be possible when the vehicle availability is known before assignment of vehicles to charging points.

The electric vehicle charging infrastructure may include electric grid components, e.g., a generating station, transmission lines, distribution lines, substations, converters, rectifiers, etc.

The electric vehicle charging infrastructure may be implemented in various contexts including a public parking lot (i.e., car park), a logistics center, or a cooperate office. More generally, applicable contexts may include situations in which multiple vehicles share (elements or components of) electric vehicle charging infrastructure.

In addition, gaps in the schedule information (e.g., missing arrival time, departure time or missing vehicle information) can also be accounted for.

In some implementations, the electric vehicle may be a road vehicle (e.g., a car/automobile) or a rail vehicle. More generally, the electric vehicle may be a ground vehicle. Airborne, or sea-based electric vehicles having power requirements similar to ground vehicles are also possible. For example, in the case of an aerial vehicle, the electric vehicle may be an unmanned aerial vehicle (i.e., a drone).

In some implementations, the electric vehicle includes at least one battery. Charging of the electric vehicle may be effected by charging the battery. More particularly, the electric vehicle may include a rechargeable battery, e.g., an automotive battery such as an electric vehicle (e.g., traction) battery. The battery may be a lithium-ion or lithium polymer battery. Other battery types, such as lead-acid, NiCd, or nickel-metal hydride may also be used. The electric vehicle may also include a battery management system for managing the battery.

In some cases, current is provided in three phases at each of the charging points. A neutral connection may be shared by the three phases. The three phase voltage may be about 380V, 400V, or 415V. Other voltages may also be used. The frequency may be about 50 or 60 Hz.

In some examples, about 230V may be provided between the neutral connection and any one of the three phases, and about 400V may be provided across any two of the phases. Thus, three conductors carrying alternating current that are offset in time by one-third of the period may be provided at each of the charging points.

Alternatively, one phase or two phase power may be provided at one, multiple ones or all of the charging points. In this case, alterations to some of the steps discussed below would need to be carried out.

Provision of the current in three phases may have the advantage that some vehicles can use all three phases and thereby charge more quickly. Further, it may be possible to minimize load imbalance across the three phases, as discussed in more detail below.

In some implementations, a duration of the time interval may match a duration at which power can be purchased from a provider. In this context, the provider may be an electric utility (e.g., public utility) that engages in electricity generation and distribution. The time interval duration may be a multiple of five units of time (e.g., seconds, minutes, hours). Specifically, the time interval duration may be at least five minutes, at least ten minutes, at least 15 minutes, at least 20 minutes, or at least 30 minutes.

The respective electric vehicle may be assigned to charge at a corresponding one of the charging points for multiple time intervals, i.e., the vehicle may be in place at the charge point and may charge during the assigned time intervals. In this case, each of the time intervals may have the same duration. Further, the time intervals might not be contiguous. For example, a specific electric vehicle might be assigned to charge for a time interval between 9:00 and 9:15 in the morning, and subsequently for a time interval between 12:00 noon and 12:15 in the afternoon.

In some cases, each of the electric vehicles is assigned to charge at one of the charging points for at least one time interval according to the respective power constraint.

In some examples, the respective electric vehicle is assigned to charge at one of the charging points based on optimization of an objective function. The optimization may comprise one or more of the following: mixed integer programming (MIP), at least one inequality constraint, the big M method for using the simplex algorithm.

The objective function may be optimized using a solver, e.g., a mixed integer programming solver such as Solving Constraint Integer Programs (SCIP).

Mixed integer programming (or mixed integer linear programming) may provide a more efficient implementation in comparison to unconstrained linear programming (i.e., the unknown variables are not required to be integers) or integer programming (i.e., in which all the unknown variables are required to be integers).

Use of inequality constraints may enable greater flexibility in the optimization, particularly with regard to consideration of power constraints, in comparison to optimization limited to equality constraints.

Vehicle power characteristics may only enable a subset of power constraints for the respective vehicle to be determined. If this is the case, a minimum standard can be used for the power constraints that cannot be determined (e.g., only one phase of current and a maximum current amount of 16 A). The minimum standard may reflect vehicle power characteristics of the least capable vehicle for which schedule information is was received. This may lead to better optimization compared to the determination of no power constraints, even if a fully optimal solution is not achieved. In some implementations, the objective function may have at least one of the following optimization components:

a fair share component to minimize the number of electric vehicles below a corresponding minimum state of charge (i.e., a minimum state of charge specific to the electric vehicle), a cost component to minimize a cost of power (i.e., electricity cost), a peak demand component to minimize differences in power consumption over time, wherein minimizing differences over time may include minimizing differences in power consumption across time intervals, a load imbalance component to minimize differences in power consumption across phases, wherein the load imbalance may be minimized according to a linear approximation.

The components may be weighted. The fair share component may have a higher weight than the other components. Weighting the fair share component higher than the other components may avoid a situation in which the optimal solution is not to charge at all. In some cases, only the fair share component is optimized. In other cases, fair share and cost components are optimized. Other components may be eliminated as well. For example, the fair share, cost component, and load imbalance components may be optimized, such that only the peak demand component is eliminated. Other combinations of optimization components are also possible.

Providing an objective function having multiple components, each of which can be optimized, may have the advantage of flexibility. In particular, different weights can be assigned to each of the components and changed according to technical considerations (e.g., power grid fragility or a need to charge vehicles in a certain amount of time). For example, costs may become more important, such that minimizing the cost of power might need to be assigned a higher weight. Similarly, load imbalance or peak demand may have a greater effect on the cost of power, or on overall grid stability, or on other services needing to use an electric infrastructure (the charging infrastructure may be part of the electric infrastructure). Accordingly, in some locations it may be desirable to give the peak demand component or the load imbalance component a higher weight than in other locations.

In some cases, the method further comprises, after assigning the respective electric vehicle to charge at one of the charging points for at least one time interval, checking assigned time intervals (e.g., all scheduled time intervals) for an error condition (i.e., a violation). When the error condition occurs (i.e., arises or is triggered) for a respective time interval, the method may further comprise rescheduling at least one electric vehicle assigned to the respective time interval. The error condition may occur when an electrical safety device connected to the respective charging point is overloaded. The rescheduling may comprise preventing the respective electric vehicle from being reassigned to the respective time interval (i.e., blocking the time interval) and assigning the respective electric vehicle to a different time interval (at the same or a different charging point).

In some cases, an electric vehicle to be rescheduled may be determined according to a priority function. The priority function may include prioritization components corresponding to the optimization components of the objective function.

In some implementations, the rescheduling may result in a reduced optimization of at least one of the optimization components of the objective function. For example, the at least one electric vehicle may be reassigned to another time interval having a higher cost of power then the time interval to which the electric vehicle was originally assigned. The reduced optimization may be reflected in an increased cost of power, an increased difference in power consumption across time intervals or an increased difference in power consumption across phases. Further, it may be that the reduced optimization results in a situation in which not all of the electric vehicles are able to reach a respective maximum state of charge or even a respective minimum state of charge.

In some cases, the electric vehicle charging infrastructure may further comprise a plurality of electrical safety devices. Each of the charging points may be dependent on at least one of the electrical safety devices.

Moreover, the respective electric vehicle may be assigned to charge at one of the charging points for the time interval based on the electrical safety devices. More particularly, the rated current for each of the electrical safety devices may be a factor in determining which one of the charging points the respective electric vehicle is assigned to.

The electrical safety devices may be fuses or circuit breakers.

In some implementations, the electrical safety devices may be implemented via a tree data structure. For example, the electrical safety device at the root of the data structure may have a rated current higher than any of the other electrical safety devices in the data structure. The data structure may be hierarchical, such that electrical safety devices at the leaves have the lowest rated current and the rated current increases upon upward traversal of the tree until the electrical safety device at the root is reached.

Accordingly, the charging point to which the respective electric vehicle is assigned may be determined based on the rated current of each of the electrical safety devices upon which the charging point depends.

The vehicle availability may describe when the vehicle is available to be charged.

Accordingly, the vehicle availability may include an arrival time, e.g., a planned arrival time. Additionally or alternatively, the vehicle availability might include one or more time intervals during which the vehicle can be charged. The vehicle availability may include a departure time.

The inclusion of both the arrival time and the departure time in the vehicle availability may have the advantage of providing optimization flexibility. In particular, a time interval for charging the vehicle can be scheduled such that costs are reduced or such that a chance of the vehicle for reaching a minimum state of charge or a maximum state of charge is maximized. The optimization flexibility may also be achieved by including more time intervals than necessary for charging the vehicle in the vehicle availability.

In some implementations, the power constraint may include one or more electric current constraints. The electric current constraints may relate to when electric current can be supplied to the vehicles and/or how much electric current can be supplied to the vehicles. One or more of the electric current constraints may depend on the vehicle model. That is, different models may have different current constraints, or put another way, the electric current constraints may be specific to the vehicle model.

More specifically, the electric current constraints may depend on a battery management system of a vehicle model and/or a protocol (e.g., IEC—International Electrotechnical Commission—61850) used for communication between the charging point and the corresponding electric vehicle.

The electric current constraints may specify at least one of the following:
 an amount of current that can be supplied to the corresponding electric vehicle,
 whether varying current can be supplied to the corresponding electric vehicle,
 whether more than one phase of current can be supplied to the corresponding electric vehicle,
 which phase of current the corresponding electric vehicle is capable of charging on.

Varying current may refer to supplying different amounts of current at different times. For example, varying current may refer to supplying 16 Amps (A) at 9:00 in the morning (for at least one time interval) and 32 A at 10:15 in the morning (for at least one time interval). Some vehicle models may support varying current, other vehicle models might not support varying current.

Whether more than one phase of current can be supplied to the electric vehicle may refer to the capability of the electric vehicle to charge on three phases of current or just one phase of current. This electric current constraint may be determined from the vehicle model.

The phase of current the electric vehicle is capable of charging on may be applicable to electric vehicles that are only capable of charging on one phase. In some cases, such vehicles are only capable of charging on phase 1, and not on phase 2 or phase 3. Other phase restrictions for one phase electric vehicles are also possible.

In some cases, the electric current constraint specifying the amount of current that can be supplied to a corresponding one of the electric vehicles includes a maximum amount of current with which the corresponding electric vehicle can be charged (maximum current constraint) and/or a minimum amount of current with which the electric vehicle can be charged (minimum current constraint). The maximum amount of current may specify a single value, e.g., between about 16 A and about 63 A. The minimum amount of current may be a single minimum value or a range of excluded values. In other words, the minimum amount of current may be specified via an inequality (e.g., 16 A) or may exclude a range of current. For example, 0 A may be allowed but a range between 0 A and 6 A might not be allowed (i.e., the vehicle could not tolerate being charged at a current between 0 A and 6 A).

Exceeding the maximum current may result in damage to a battery of an electric vehicle. The minimum current constraint may be a requirement of a protocol used to communicate between the charging point and the electric vehicle (e.g., IEC 61850). Violation of the minimum current constraint may cause the electric vehicle to stop charging and lead to less efficient use of the charging infrastructure (e.g., another vehicle could be charged during this period).

The electric current constraints may specify at least one of the following:
- whether the corresponding electric vehicle will tolerate delayed charging (delayed charging constraint), wherein delayed charging may include starting to charge the electric vehicle with 0 A of current;
- whether the corresponding electric vehicle will tolerate suspended charging (suspended charging constraint), wherein the suspended charging includes providing no current (i.e., 0 A) to the electric vehicle after providing a current of greater than 0 A to the electric vehicle;
- whether the corresponding electric vehicle will tolerate different levels of current (i.e., variable current) while charging (variable current constraint), wherein the different levels of current are provided within a specified duration, wherein the specified duration may be up to 15 minutes, up to 30 minutes, up to one hour or within a period required to reach a minimum state of charge of the corresponding electric vehicle.

Delayed charging may involve sending a signal to a charging point indicating that an electric vehicle assigned to the charging point can be charged. The charging point may then send a signal to the electric vehicle that indicates an amount of current the vehicle is allowed to consume. In this case, the amount indicated is 0 A.

Violating a delayed charging constraint, a suspended charging constraint or a variable current constraint with respect to a corresponding electric vehicle may lead the corresponding electric vehicle to stop charging, even when the vehicle is allowed to charge (i.e., power is being supplied).

Consideration of the electric current constraints may enable more efficient control of the electric vehicle charging infrastructure. In particular, when electric current constraints are not considered, it might be necessary to treat all of the electric vehicles as though they had the constraints of a least capable vehicle. This could result in periods during which charging points or other elements of the electric vehicle charging infrastructure are not in use. Further, consideration of the electric current constraints may enable costs to be reduced. In particular, consideration of the electric current constraints may make it possible to balance the load across multiple phases and/or to reduce differences in power consumption over time. Moreover, it may be possible to reduce the cost of power by considering electric vehicle constraints in combination with intraday power costs.

The specified duration may be a multiple of the time interval (e.g., a multiple of 15 minutes). Consideration of the capability of the electric vehicle to tolerate delayed charging (whether the vehicle must start charging upon arrival at the charging point), suspended charging (whether charging can be stopped after it starts), or variations in current may facilitate charging the vehicle to a minimum or maximum state of charge (i.e., through more efficient use of the charging infrastructure).

It may be desirable to bring as many vehicles as possible to a minimum state of charge before bringing electric vehicles to a maximum state of charge. This approach may make it possible to bring more electric vehicles to a minimum state of charge than would otherwise be possible. Accordingly, once an electric vehicle has been brought to a minimum state of charge, the current being provided to the vehicle may be suspended in order to bring another vehicle to a minimum state of charge. Once all vehicles have been brought to the corresponding minimum state of charge, as many vehicles as possible may be brought to a maximum state of charge.

In some implementations, the vehicle power characteristic may include an attribute specific to the corresponding electric vehicle. The attribute may be energy efficiency (e.g., charging efficiency) information for the electric vehicle. The energy efficiency information may reflect (i.e., describe) a charging or battery efficiency of the electric vehicle. The charging efficiency may be the amount of power delivered to a vehicle (e.g., to a battery of the vehicle) divided by the amount of power discharged by the charging station. This takes into account the loss of energy to heat. For example, a battery for an electric vehicle (e.g., a lithium battery) may typically have a charging efficiency of about 80%. However, battery efficiency may decrease over time.

The power constraint may include an energy efficiency constraint. In this case, the vehicle power characteristic may include energy efficiency information for the electric vehicle. The energy efficiency constraint may refer to an energy conversion efficiency, i.e., a ratio between a useful output and an input to the electric vehicle. The energy efficiency constraint may be dependent on a specific electric vehicle (e.g., battery characteristics, possibly reflecting battery degradation over time). The energy efficiency constraint may be determined based on the energy efficiency information for the specific electric vehicle.

The schedule information may further include an indication of a minimum state of charge. The indication of the minimum state of charge may include one or more of a planned distance to travel and at least one destination. The minimum state of charge may be independent of the total number of electric vehicles and the way the electric vehicles are charged. The minimum state of charge may be dependent on how the electric vehicle is used until it is next charged. Accordingly, the indication of the minimum state of charge may enable a determination of how much the electric vehicle needs to be charged in order for the vehicle to reach its corresponding minimum state of charge.

In some cases, the electric vehicle type may specify whether the electric vehicle is a battery electric vehicle (BEV) or a plug-in hybrid electric vehicle (PHEV).

The charging phase capacity may specify whether the electric vehicle is able to use three phases of alternating current or only one phase of alternating current.

In some cases, the minimum state of charge may reflect a charge needed for the electric vehicle to safely reach a next charging point. For example, if the electric vehicle charging infrastructure is part of a corporate office, the next charging point may be a private residence of a user of the vehicle.

The minimum state of charge for a vehicle may depend on one or more of the following:
- a current SoC of the vehicle, e.g., a current battery charge of the vehicle,
- a distance the vehicle is required to cover (i.e., travel) in order to reach a next charging point (or return to the current charging point); this may be a user provided value or may be estimated using historical data (or the user provided value may be checked/corrected using historical data);
- a rate at which vehicle state of charge dissipates according to distance traveled.

The minimum state of charge for a vehicle may be estimated, e.g., as a specified portion of vehicle charge or battery capacity. For example, the minimum state of charge may be at least one third of vehicle charge capacity, about 40% to about 60% of vehicle charge capacity, about 45% to about 55% of vehicle charge capacity or about 50% of vehicle charge capacity. The estimated percentage may also be offset according to a planned travel distance, according to the age of the vehicle, according to the charge capacity of the vehicle or other factors.

In some implementations, the method may comprise determining, from the vehicle power characteristic, one or more of the following for the electric vehicle:
- a time required to reach the minimum state of charge,
- a maximum state of charge or vehicle charge capacity,
- the electric vehicle type, and
- a charging phase capability.

In such implementations, the vehicle power characteristic may include a vehicle model.

A computer program comprising computer readable instructions is provided. The instructions, when loaded and executed on a computer system, caused the computer system to perform operations according to the method described above.

According to an aspect, a computer system for controlling electric vehicle charging infrastructure is provided. The charging infrastructure is for use by a plurality of electric vehicles. The charging infrastructure comprises a plurality of charging points. The system comprises at least one processor configured to receive schedule information for the electric vehicles, the schedule information including, for each of the electric vehicles, at least one vehicle power characteristic. The processor is further configured to determine at least one power constraint for each of the electric vehicles based on the vehicle power characteristic. The processor is further configured to receive an arrival indication for a respective one of the electric vehicles. The processor is further configured to assign the respective electric vehicle to charge at one of the charging points for at least one time interval according to the respective power constraint.

The computer system may be configured to perform operations according to the method steps described above.

The computer system may further comprise a database for storing vehicle power characteristics, and optionally, vehicle availability. The computer system may also include a data model for use in determining a charging schedule. The computer system may be connected to a solver for determining the charging schedule using the data model.

The subject matter described in this disclosure can be implemented as a method or on a device, possibly in the form of one or more computer programs (e.g., computer program products). Such computer programs may cause a data processing apparatus to perform one or more operations described in the present disclosure.

The subject matter described in the present disclosure can be implemented in a data signal or on a machine-readable medium, where the medium is embodied in one or more information carriers, such as a CD-ROM, a DVD-ROM, a semiconductor memory, or a hard disk.

In addition, the subject matter described in the present disclosure can be implemented as a system including a processor, a memory coupled to the processor. The memory may encode one or more programs to cause the processor to perform one or more of the methods described in the present disclosure. Further subject matter described in the application can be implemented using various machines.

Details of one or more implementations are set forth in the exemplary drawings and description that follow. Other features will be apparent from the description, the drawings, and from the claims.

DETAILED DESCRIPTION

In the following text, a detailed description of examples will be given with reference to the drawings. Various modifications to the examples may be made. In particular, one or more elements of one example may be combined and used in other examples to form new examples.

Figure 1:
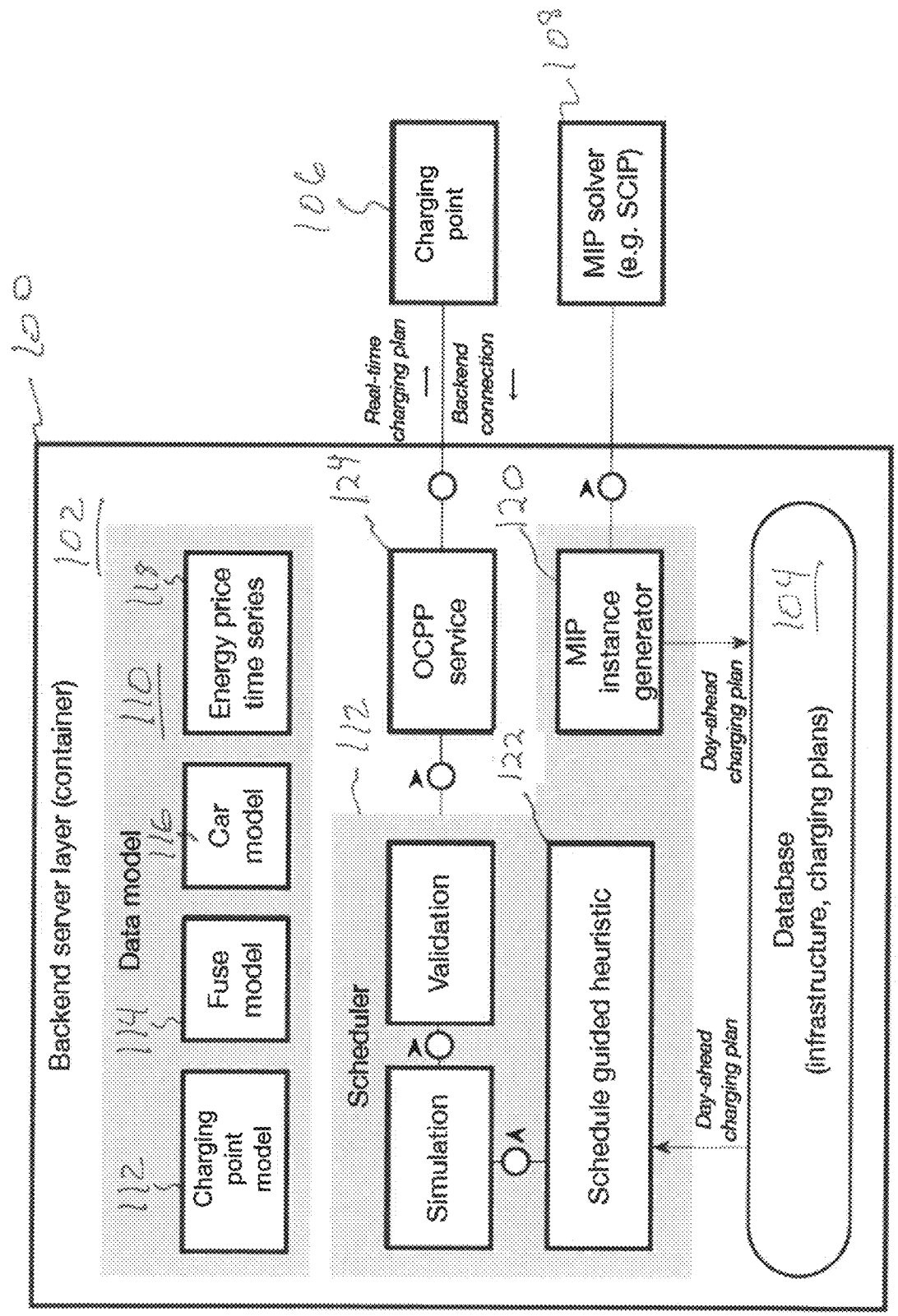
FIG. 1 shows a block diagram including a computer system for controlling electric vehicle charging infrastructure.

FIG. 1 shows a computer system 100 for controlling electric vehicle charging infrastructure. The computer system 100 may include a server 102 (backend server layer) and a database 104. The computer system 100 may be connected to the charging infrastructure. In particular, the computer system 100 may be connected to at least one charging point 106.

In some examples, the charging point 106 may be part of a charging station, possibly along with further charging points, or alternatively, the charging point 106 may be standalone (e.g., within a parking lot including multiple standalone charging points).

In some examples, the computer system 100 may be connected to a solver. The solver may be mathematical software that solves a mathematical problem. More particularly, the solver may take a problem description and calculate a solution. The solver 108 may be a mixed integer programming solver. More particularly, the solver 108 may calculate a solution for a linear optimization problem. The solver 108 may be implemented using the Solving Constraint Integer Programs (SCIP) framework or a another framework such as The Gurobi Optimizer or IBM ILOG CPLEX.

The computer system 100 may include a data model 110. The data model 110 may be used for assigning electric vehicles to charge at charging points according to power constraints of the electric vehicles. More particularly, the data model 110 may be used to determine which charging points electric vehicles will be assigned to and when the electric vehicles will charge at the charging points. The data model 110 may include a charging point model 112. The charging point model 112 may include a phase map, as discussed in more detail in the context of FIG. 3.

Briefly, the phase map describes how phases of alternating current received from a power provider (e.g., electric utility) are mapped to phases of the charging point 106.

The charging point model 112 may include decision variables. Decision variables may include vehicle assignment variables $X_{i,n}$ and current variables $I_{i,j,k}$. A vehicle assignment variable $X_{i,n}$ specifies an assignment of vehicle n to charging point i. An amount of current $I_{i,j,k}$ variable specifies the amount of current at charging point i during timeslot k in phase j. Variables and abbreviations are also included in a list provided at the end of the description, just before the claims.

The terms "timeslot" and "time interval" are used interchangeably. The time intervals k may correspond to the intervals for which power is received from the power provider. For example, power may be provided by the power provider in 15 minute intervals.

The charging point model 112 may be used to ensure that each electric vehicle is assigned to at most one charging point 106 and that each charging point has at most one electric vehicle per timeslot k. The charging point model 112 may also reflect the number of charging points and the amount of current available at each charging point 106. Further, the charging point model 112 may reflect the phases of current available at each charging point 106, as discussed above and in the context of FIG. 3.

In some cases, the data model 110 may also include an electrical safety device model 114. The electrical safety device model 114 may be implemented as a fuse model, e.g., a fuse tree. However, circuit breakers or other types of electrical safety devices may also be used. The electrical safety device model 114 is discussed in more detail in the context of FIG. 2. Briefly, the electrical safety device model 114 may be implemented via a tree data structure, such that the electrical safety devices of the charging infrastructure are represented as a tree of fuses. The electrical safety device model may be used to ensure that no charge point is supplied with more current than what can be handled by the electrical safety devices upon which the charge point depends, e.g., a given charge point may depend on a path of fuses in the tree starting from a leaf the charge point and following a line up to the root.

The data model 110 may further include an electric vehicle model 116, e.g., a car model. The electric vehicle model 116 may include a model name, a charge capacity, and a number of phases that can be used for charging (e.g., in view of battery tolerance). The electric vehicle model 116 may also include energy efficiency information and electric vehicle type. For each model of electric vehicle in the electric vehicle model 116, information regarding maximum allowed current, minimum allowed current (possibly a range above 0 A), whether varying current can be supplied, as well as whether current can be delayed or suspended may be provided.

In some implementations, the vehicle model 116 may include models having heterogeneous charging behavior. In particular, vehicle models having different maximum allowed current or being capable of receiving current across one, two or three phases may be supported. The electric vehicle model 116 may also include charging information, e.g., regarding electric vehicle (e.g., traction) batteries, Further, different battery types (e.g., lithium ion, lithium-ion polymer or nickel metal hydride) may be described. The electric vehicle model 116 may include information regarding ground (e.g., road or rail), sea or aerial vehicles (e.g., unmanned aerial vehicles such as delivery drones).

The data model 110 may include power cost information 118 (e.g., energy price times series). The power cost information 118 may be reflected as intraday power costs, as discussed in more detail in the context of FIG. 5.

The database 104 may include vehicle power characteristics, and optionally, vehicle availability information. More particularly, the database 104 may include planned vehicle arrival and departure information, and vehicle specific information (e.g., energy efficiency). The data model 110 may be stored in the database 104 or may be maintained separately.

The server 102 may include a scheduler 112. The scheduler 112 may access the data model 110 and the database 104 in order to determine a charging schedule according to the at least one power constraint for each of the electric vehicles. More particularly, at least one power constraint or a plurality of power constraints may be determined for the electric vehicles using at least one vehicle power characteristic.

The charging schedule may also be determined according to vehicle availability. The vehicle availability may be provided before or after arrival of the electric vehicles. For example, a departure time may be provided upon arrival of a respective electric vehicle, even if no arrival time was previously provided.

Power constraints may include vehicle model dependent constraints, phase of current related constraints and vehicle specific power constraints. The scheduler 112 may be capable of performing a real time charging simulation. The charging simulation may be event based, where each event represents the arrival of an electric vehicle, the departure of an electric vehicle or a periodic recalculation of the charging schedule. The periodic recalculation may be triggered after a specified number of time intervals (e.g., every time interval) due to potential power cost changes. A time step within the simulation may be one second. Accordingly, the simulation may simulate vehicle charging for each time step throughout a longer time period, e.g., a day.

The server 102 may be implemented using a general purpose computer. More particularly, the server 102 may be implemented using an Intel Xeon E5-2660 v4 CPU with 128 GB of RAM. The solver 108 may be implemented using SCIP version 4.0.1 with a relative optimality gap set to 0.01.

In some cases, a model instance for determining the charging schedule may be generated via a model instance generator 120 using information from the database 104 and the data model 110. The model instance generated by the model instance generator 120 may be provided to the solver 108 for a solution. More particularly, the data model 110 may be translated into a system of equations (e.g., mathematical inequalities) that can be used as input to the solver 108.

Accordingly, the solver 108 may provide the charging schedule according to the at least one power constraint and a plurality of weighted optimization components, as discussed in more detail below. The scheduler 112 may also include a schedule guided heuristic 122, as discussed in more detail in the context of FIG. 11.

The scheduler 112 may also perform validation of the charging schedule, e.g., in order to identify and resolve error conditions. The identification and resolution of error conditions is discussed in more detail in the context of FIG. 11. As an example of an error condition, the fuse tree may include a first pre-fuse (i.e., a non-leaf fuse or a fuse not attached to a charging point) having a rated current of 50 A. If the scheduler 112 assigns vehicle A (32 A) and vehicle B (32 A) to corresponding charging points depending on the first pre-fuse, the validation would identify an error condition, since 64 A>50 A and prevent assignment of vehicles A and B to charge at the corresponding charging points for the same time interval.

A communication service 124 may be used by the scheduler 112 to interact with the charging points 106. The communication service 124 may be implemented using the Open Charge Point Protocol (OCPP). The communication service 124 may send schedules to charging points to which electric vehicles have been assigned. The sending of a schedule to a charging point may cause a respective electric vehicle (EV) to charge at the charging point for the time interval(s) specified in the schedule. More particularly, the charging points may send signals to EVs, e.g., via pulse width modulation, indicating an amount of current the respective EV is allowed to draw (consume) for the time interval(s) specified in the schedule.

Examples of electric vehicles whose characteristics may be reflected in the electric vehicle model 116 include road vehicles such as the Tesla Model S, The Nissan Leaf, the BMW i3, the Mercedes GLC, and the Renault Zoe. Characteristics of specific vehicle models (possibly a subset of the information for these vehicles in the vehicle model 116) are shown in table 1 below:

TABLE 1

| Model name | Battery capacity (Ah) | Number of phases |
|---|---|---|
| Tesla Model S85 | 369,565 | 3 |
| Nissan Leaf 2016 | 130,435 | 1 |
| BMW i3 2017 | 94,000 | 3 |
| Mercedes GLC 350e | 37,826 | 1 |
| Renault Zoe R240 | 95,500 | 3 |

The values in table 1 might not accurately reflect information for the corresponding vehicle models, but are provided as exemplary data that might be derived from vehicle power characteristics, e.g., from vehicle models.

The electric vehicle model 116 may include vehicles having different battery capacities, different maximum levels of current with which the electric vehicle can be charged (e.g., one vehicle might have a maximum current amount of 16 A whereas another vehicle has a maximum current amount of 32 A), variations in the number of phases across which the vehicle can be charged (e.g., one vehicle might only be chargeable across one phase whereas another vehicle may be chargeable across three phases), and phases on which the vehicle can be charged (e.g., only phase one, typically applicable for 1 phase rather than 3 phase vehicles).

The database 104 may include vehicle availability, which could be received from users or estimated. The vehicle availability may include arrival time, departure time, one or more time intervals during which the electric vehicle is available for charging. In some cases, the database 104 may include historical vehicle availability rather than vehicle availability received from users of electric vehicles. In such a case, vehicle availability used by the scheduler 112 may be estimated (i.e., predicted) from historical vehicle availability.

When an arrival time is not provided for an electric vehicle, the electric vehicle may be integrated into the charging schedule (i.e., assigned to a charging point) when an indication of arrival for the vehicle is received. Provision of the arrival time may enable more efficient scheduling.

Provision of the departure time may facilitate minimization of power cost. However, the departure time could also be estimated based on historical information or not used. If the departure time is not used, then an effort may be made to charge the electric vehicle as quickly as possible or the electric vehicle may be given a lower priority.

According to one example, historical schedule information may follow a roughly normal distribution with peaks at 08:00 in the morning and 17:15 in the evening and standard deviations of approximately 2.56 hours and 2.42 hours, respectively. In other words, according to the example, the historical schedule information may show that users arrive on average around 08:00 and depart on average around 17:15 with a standard deviation from the arrival time of 2.56 hours and a standard deviation from the departure time of 2.42 hours. The departure time could also be estimated from the arrival time, e.g., by adding eight hours or the number of hours in a typical work day to the arrival time or by using historical departure times for the user.

The charging schedule may be at least partially preemptive. In particular, once charging of an electric vehicle has begun, the charging can be suspended. For example, the electric vehicle may be assigned to charge until it reaches a minimum state of charge and then charging of the electric vehicle may be suspended until other vehicles also reach a minimum state of charge.

In some cases, electric vehicles do not tolerate suspension of charging. The electric vehicle model 116 may reflect whether individual electric vehicles tolerate suspension of charging. More particularly, a battery management system of an EV might not tolerate suspension of charging. If the EV does not tolerate suspension of charging, then the EV might not draw current in response to a signal from the communication service 124.

The data model 110 may reflect power constraints related to charging the electric vehicles. The power constraints may relate to limitations of the electric vehicles and affect how the electric vehicles can be charged. The power constraints may be determined based on vehicle power characteristics. The power constraints may include electric current constraints relating to how current can be supplied or the amount of current that can be supplied to the vehicle, as well as energy efficiency constraints relating to the ratio of power delivered to the vehicle battery and power discharged to the vehicle by the charging point. Consideration of power constraints may have the advantage of enabling the determined charging schedule to be applied without manual post processing. In addition, consideration of power constraints in the charging schedule may result in more efficient use of the electric vehicle charging infrastructure.

The data model 110 may be implemented via an objective function. The objective function may be implemented via a mixed integer linear program. Accordingly, the data model 110 may specify n electric vehicles (EVs), where each EV represents a charging job which is to be scheduled on one of i charging points, during k time intervals (i.e., timeslots).

The data model 110 may reflect limitations of the electric vehicle charging infrastructure. Limitations may include power line capacities and electrical safety device capacities. The objective function may be implemented as a weighted linear combination of four components:
- a fair share component, for minimizing inequalities between individual electric vehicle states of charge; the fair share component may be calculated for each vehicle and may be proportional to a difference between the current state of charge of a respective vehicle and a maximum state of charge of the respective vehicle;
- a cost component, for minimizing the cost of power in view of intraday power costs;
- a peak demand component, for minimizing the difference in power consumption between time intervals;
- a load imbalance component, for minimizing the difference in power consumption across phases.

The four components of the objective function may provide flexibility. In particular, different optimization goals can be pursued by assigning different weights to the different components (see equation (1) below). In some cases, the fair share component may be weighted highest.

It may be desirable to focus on different components of the objective function in different contexts. For example, peak demand may be prioritized in settings in which other users of the electric grid cause spikes in power (e.g., the grid is already somewhat unstable). In such cases, it may be desirable to minimize any spikes in power that be caused by the electric vehicles, particularly in conjunction with other users. Alternatively, minimizing the power cost component can be particularly advantageous when electricity costs vary widely throughout a given day. Further, situations may arise in which large load imbalances occur, such that differences in the current across multiple phases may need to be minimized, e.g., to preserve grid stability.

The electric vehicle model 116 may also reflect a current state of charge for each vehicle. The current state of charge may be estimated. The estimation may be realized, for example, via a simulation of electric vehicle routes in realistic scenarios or by means of reverse engineering on historical data. For example, a previous day's state of charge may be recorded for an electric vehicle at the end of the day and a predicted state of charge for the vehicle for the next day may be calculated by using information provided regarding distance traveled by the vehicle and battery efficiency information for the vehicle. Alternatively, a state of charge recorded upon arrival of the vehicle one day may be used to estimate the state of charge that the vehicle will have upon arrival the next day.

Power constraints may be dependent on a vehicle model. For example, different vehicle models may charge differently. In particular, some vehicle models may charge at one phase whereas other charge on three phases (see Table 1). Further, some vehicle models may allow charging to be suspended whereas other models do not. Power constraints may also be dependent on per phase limitations (e.g., a limit on the power that can be drawn over phase one of three phases) and phase rotations in the charging points. Phase rotations are discussed in more detail in the context of FIG. 3.

Some power constraints are not available from a vehicle manufacturer, but were determined via experimentation. For example, constraints for suspended charging, delayed charging and variable charging were determined via experimentation.

While consideration of power constraints increases the complexity of the problem of determining the charging schedule as well as the number of constraints in total, consideration of power constraints also makes it possible to use the electric vehicle charging infrastructure more efficiently and increases the practicality of the solution provided by the solver 108 (e.g., by avoiding post-processing).

The data model 110 may include decision variables or unknown quantities to be determined. The decision variables and the constraints may be understood in the context of linear programming. Exemplary decision variables are mentioned above and in the list provided before the claims.

The data model 110 may include binary variables to express relationships such as phase ratios, whether delayable charging is supported, whether suspendable charging is supported, and the capability to vary (i.e., increase or decrease) charging power over time. The use of binary variables may have the advantage of avoiding non-linearity and significant complexity in the data model 110. In this way, use of binary variables may enable the charging schedule to be determined more efficiently, e.g., by using the solver 108 more efficiently.

The objective function may be implemented as a cost minimization of a weighted combination of power cost $z_2$ and penalty costs for fair share $z_1$, peak demand $z_3$ and load imbalance $z_4$ with weights $w_1$ to $w_4$. An exemplary objective function is provided below in equation (1):

$$\min: z = w_1 * z_1 + w_2 * z_2 + w_3 * z_3 + w_4 * z_4 \quad (1)$$

The components of the objective function above may be defined as shown in equations (2)-(5) below:

$$\min: z_1 = Q'_{n,below} + c * Q'_{n,above} \quad (2)$$

$$\min: z_2 = \Sigma_{i,j,k} 0.25 * c_k * P_{i,j,k} \quad (3)$$

$$\min: z_3 = \Sigma_k E_k^+ + E_k^- \quad (4)$$

$$\min: z_4 = \Sigma_k ((D_{k,1,2}^+ + D_{k,1,2}^-) + (D_{k,2,3}^+ + D_{k,2,3}^+) + (D_{k,1,3}^+ + D_{k,1,3}^-)) \quad (5)$$

Equation (2) defines the fair share component, equation (3) defines the power cost component, equation (4) defines the peak demand component and equation (5) defines the load imbalance component. Equation (2) is explained in more detail in the context of FIG. 4. Equation (4) is explained in more detail in the context of equation (35).

A number of parameters may be determined and provided in the data model 110. These parameters may include intraday power cost (i.e., energy price time series), starting state (i.e., current state) of charge for an electric vehicle, minimum state of charge ($SoC_{min}$) for the electric vehicle, maximum state of charge ($SoC_{max}$) for the electric vehicle, electric vehicle availability, and current limits per electrical safety device. The parameters are included in the list provided at the end of the description.

Exemplary constraints of the data model (i.e., inequalities or equalities defining limitations on decision variables) are defined in the following. Equations (6) and (7) (assignment constraints) may ensure that each electric vehicle is assigned to at most one charging point and each charging point has at most one electric vehicle per timeslot k.

$$\Sigma_i X_{i,n} \leq 1 \qquad (6)$$

$$\Sigma_i X_{i,n} * d_{k,n} \leq 1 \qquad (7)$$

Equation (8) relates to the charging $b_n$ needed by a vehicle to reach a maximum state of charge. Equation (8) may be determined for each electric vehicle before determining the charging schedule.

$$\Sigma_{j,k} 0.25 * w_n * d_{k,n} * I_{i,j,k} \leq b_n + M(1-X_{i,n}) \qquad (8)$$

In equation (8), $w_n$ is the charging efficiency of the electric vehicle (e.g., a battery efficiency) and 0.25 is a scaling factor to convert from Amps to Amp-hours, since $I_{i,j,k}$ is in Amps. $d_{k,n}$ indicates vehicle availability, i.e., whether the vehicle n is available at timeslot k.

The expression $M(1-X_{i,n})$ is an "if-statement" in the context of mixed integer programming: if $X_{i,n}$ (vehicle n is assigned to charging point then $M(1-X_{i,n})$ evaluates to 0. In this case, $b_n$ is the only relevant term on the right hand side of equation (8). The "if-statement" ensures that if the vehicle n is not assigned ($X_{i,n}$=0) then vehicle n does not affect other vehicles charging at charging point i. This pattern is repeated in other constraints (see e.g., equation (15)).

Equation (8) is an example of a power constraint, more particularly, an energy efficiency constraint. Energy efficiency information for the electric vehicle, more particularly charging (e.g., battery) efficiency information, may enable the energy efficiency constraint of equation (8) to be determined.

Figure 2:
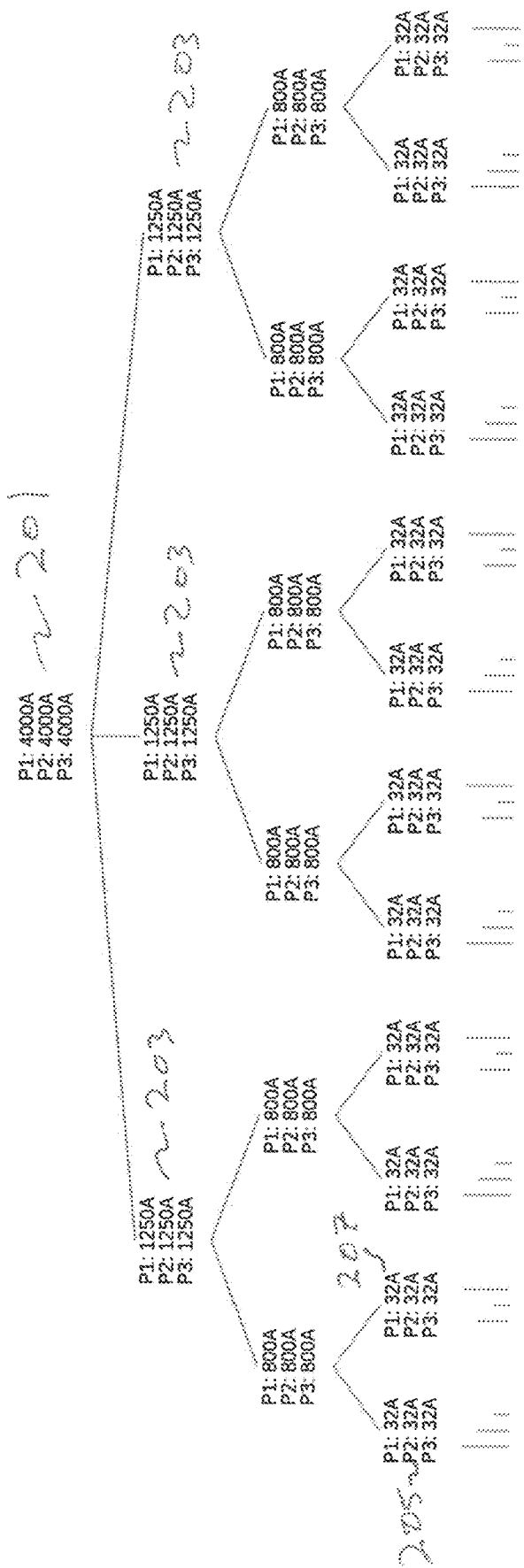
FIG. 2 shows an exemplary tree of fuses.

Equation (9) reflects the electrical safety device model 114 (as discussed in more detail in the context of FIG. 2). The PhaseMap (i.e., phase map) of equation (9) converts phase rotations of individual charging points back to externally connected phases. The phase map is discussed in more detail in the context of FIG. 3. Equation (9) may provide a constraint similar to constraints provided in the context of the knapsack problem of combinatorial optimization. The index i in equation (9) may be a child of $h_{i,j}$.

$$\Sigma_i I_{i,PhaseMap(i,j),k} \leq h_{i,j} \qquad (9)$$

Equations (10) to (13) are exemplary power constraints. The power constraints may be determined based on at least one vehicle power characteristic.

$$a_{2,n} * I_{i,1,k} - a_{1,n} * I_{i,2,k} + M * d_{k,n} * X_{i,n} \leq M \qquad (10)$$

$$a_{2,n} * I_{i,1,k} - a_{1,n} * I_{i,2,k} - M * d_{k,n} * X_{i,n} \geq -M \qquad (11)$$

$$a_{3,n} * I_{i,1,k} - a_{1,n} * I_{i,3,k} - M * d_{k,n} * X_{i,n} \geq -M \qquad (13)$$

Equations (10)-(13) describe how electric vehicles use three phase current. Accordingly, equations (10)-(13) are exemplary power constraints, more particularly, electric current constraints. Equation (10) provides an upper bound (i.e., upper limit) for a ratio of the number of vehicles charging on the 1st phase to the number of vehicles charging on the $2^{nd}$ phase and equation (11) provides a lower bound for the ratio of the number of vehicles charging on the 1st phase to the number of vehicles charging on the $2^{nd}$ phase. Equation (12) provides an upper bound for a ratio of the number of vehicles charging on the $1^{st}$ phase to the number of vehicles charging on the $3^{rd}$ phase and equation (13) provides a lower bound for the ratio of the number of vehicles charging on the 1st phase to the number of vehicles charging on the 3rd phase.

In equations (10)-(13), a vehicle power characteristic (e.g., the vehicle type or vehicle model) may enable $a_{j,n}$ to be determined. More particularly, some types of electric vehicles, e.g., some or all PHEVs, are only able to charge on the first phase. In this case, $a_{j,n}$ would be 1:0:0 ($a_{1,n}$=1, $a_{2,n}$=0, $a_{3,n}$=0) and $I_{i,j,k}$ is restricted such that $I_{i,2,k}$=$I_{i,3,k}$=0. Other types of vehicles, e.g., some or all BEVs, are able to charge on all three phases. In this case $a_{j,n}$ would be 1:1:1 ($a_{1,n}$=1, $a_{2,n}$=1, $a_{3,n}$=1) and $I_{i,1,k}$=$I_{i,2,k}$=$I_{i,3,k}$.

Further exemplary power constraints are shown in equations (14)-(19) below. More specifically, equations (14)-(19) are exemplary electric current constraints. The electric current constraints may be determined based on at least one vehicle power characteristic. More particularly, the electric current constraints may be determined based on (e.g., from) the vehicle model.

Equation (14) describes a maximum allowed current (e.g., 16 A or 32 A) with which electric vehicle n can be charged. The maximum allowed current may be determined from the vehicle model of n.

$$I_{i,j,k} \leq e_{i,j}(1-d_{k,n} * X_{i,n}) + f_{j,n} * d_{k,n} * X_{i,n} \qquad (14)$$

$f_{j,n}$ is the maximum allowed current for vehicle n on phase j. The constraint of equation (14) is only applicable if the vehicle is available for charging ($d_{k,n}$=1) and assigned to a charging point ($X_{i,n}$=1).

Equation (15) describes a minimum allowed current with which electric vehicle n can be charged (e.g., 6 A). The minimum allowed current may be determined from the vehicle model of n.

$$I_{i,j,k} \geq g_{j,n} * a_{j,n} * d_{k,n} - M*(1-X_{i,n}) - M*(1-U_{k,n}) - M*(1-V_{k,n}) * s_n \qquad (15)$$

The minimum allowed current of equation (15) may be a specific value or a range. For example, the minimum allowed current may be 6 A or a range between 0 A and 6 A. In the latter case, 0 A would be allowed, but an amount of current between 0 A and 6 A would not be allowed. Accordingly, several "if-statements" are used in equation (15) (see the explanation of an "if-statement" given for equation (8)).

Equation (16) describes whether electric vehicle n will tolerate delayed charging. Delayed charging involves starting to charge vehicle n with 0 A of current or scheduling the vehicle to charge and not supplying current. Whether the electric vehicle n will tolerate delayed charging may be determined from the vehicle model of n.

$$I_{i,j,min_k(n)} \geq g_{j,n} * a_{j,n} * r_n * X_{i,n} \qquad (16)$$

Equation (17) describes whether electric vehicle n will tolerate suspended charging. Suspended charging includes providing no current to electric vehicle n after providing a current of greater than 0 A to electric vehicle n. Whether the electric vehicle n will tolerate suspended charging may be determined from the vehicle model of n.

$$I_{i,j,k} \leq M*(1-s_n) + M*V_{k,n} + M*(1-d_{k,n}) + M*(1-X_{i,n}) \qquad (17)$$

Equations (18) and (19) describe whether electric vehicle n will tolerate variable charging, i.e., whether n will tolerate different (i.e., varying) levels of current while charging. Whether the electric vehicle n will tolerate different levels of current while charging may be determined from the vehicle model of n. For example, if a vehicle can tolerate variable charging, the vehicle can be assigned to a charging point and receive 10 A at 9:00 am and 12 A at 9:15 am.

$$I_{i,j,k} \leq I_{i,j,k+1} + M^* t_n + M^*(1-d_{k+1,n}) + M^*(1-X_{i,n}) + M^*(1-U_{k+1,n}) \quad (18)$$

$$I_{i,j,k} \geq I_{i,j,k+1} - M^* t_n - M^*(1-d_{k+1,n}) - M^*(1-X_{i,n}) + M^*(1-U_{k+1,n}) \quad (19)$$

Failure to consider an inability to tolerate delayed, suspended or variable charging could lead to a failure to charge and inefficient use of charging infrastructure.

Reduced cost of power and improved grid stability may be achieved by determining the charging schedule according to the respective power constraint based on the vehicle power characteristic, where the vehicle power constraint may include the vehicle model. For example, one or more of equations (8) and (10)-(19) could be used as power constraints for this purpose.

The data model 110 may include a high number of variables and constraints. For example, given 50 electric vehicles and 25 charging points there may be roughly $10^5$ continuous variables, $10^4$ binary variables and $10^6$ constraints. The high number of variables and constraints may lead to prohibitive computation time for the solver 108.

Accordingly, heuristics may be used for determining the charging schedule and/or determining which charging point the respective electric vehicle should be assigned to for a given time interval. An assignment heuristic may be used to determine charging point assignment variables $X_{i,n}$ in a pre-processing step before running the solver 108 to determine the charging schedule. Charging points may be assigned to electric vehicles greedily (i.e., by choosing the optimal choice at each step in order to reach a globally optimal solution). Charging points may be assigned based on the relative state of charge of the electric vehicles.

FIG. 2 shows an implementation of the electrical safety device model 114 as a tree of fuses. Although fuses are referred to in the discussion of FIG. 2, any type of electrical safety device (e.g., circuit breaker) could be used.

The tree of fuses may be part of the electric vehicle charging infrastructure that is used by a plurality of electric vehicles and controlled by the system 100 described above. The tree of fuses depicted in FIG. 2 may be part of the infrastructure of a parking lot, i.e., a car park. The tree of fuses depicted in FIG. 2 is part of a three phase power system. However, other power systems, such as one phase or two phase, may also be used.

A root 201 includes fuses for three 4000 A phases, P1, P2, and P3. Nodes 203 at depth 1 of the tree may include fuses for three phases at 1250 A. There may be three nodes 203. Six nodes at depth 2 of the tree may each have fuses for three phases at 800 A. The tree may also include twelve leaves at a depth of 3, where each of the leaves includes fuses for three phases at 32 A.

Lines directly below the leaves of the tree may indicate phase rotations. For example, a first leaf 205 may include phases such that phase 1 is connected to an external phase 1 received from the power provider, phase 2 is connected to an external phase 2 received from the power provider and phase 3 is connected to an external phase 3 received from the power provider. A second leaf 207 may include rotated phases such that phase 1 is connected to phase 2 as received from the power provider phase 2 is connected to phase 3 as received from the power provider and phase 3 is connected to phase 1 as received from the power provider. The phase rotations may be reflected in the phase map mentioned above and are discussed in more detail in the context of FIG. 3.

Each of the leaves of the depicted tree may represent one of the charging points of the electric vehicle charging infrastructure. Accordingly, each node of the tree may contain a fuse that has a charging point or an internal node as a child. The depicted tree has a depth of three, assuming that the root 201 has a depth of zero. Each leaf represents a charging point connected via three phase alternative current (three phases and four wires, including one wire for each phase and a neutral wire). Because of the phase rotation described above, the phase at the charging point might not correspond to the phase received from the power provider. This may facilitate load balancing across phases (e.g., to help redistribute the load on phase 1 to phases 2 and 3), improve grid stability and reduce power cost.

Equations (20)-(22) may be used to provide a linear approximation of load over three phases for a given time interval.

$$D_{k,1,2}^+ - D_{k,1,2}^- = \Sigma_i I_{i,PhaseMap(i,1),k} - \Sigma_i I_{i,PhaseMap(i,2),k} \quad (20)$$

$$D_{k,2,3}^+ - D_{k,2,3}^- = \Sigma_i I_{i,PhaseMap(i,2),k} - \Sigma_i I_{i,PhaseMap(i,3),k} \quad (21)$$

$$D_{k,1,3}^+ - D_{k,1,3}^- = \Sigma_i I_{i,PhaseMap(i,1),k} - \Sigma_i I_{i,PhaseMap(i,3),k} \quad (20)$$

Equation (20) is directed to the load distribution between phases 1 and 2 ($j_1$ and $j_2$), i.e., the amount of phase 1 current vs. the amount of phase 2 current. Equation (21) is directed to the load distribution between phases 2 and 3 ($j_2$ and $j_3$), and equation (22) is directed to the load distribution between phases 1 and 3 ($j_1$ and $j_3$).

The linear (as opposed to non-linear) approximation is used in equations (20)-(22) in view of the application of mixed integer programming. When another approach is used, e.g., mixed integer non-linear programming, then non-linear approximation could be used. A phase map (described in more detail in the context of FIG. 3) is used to obtain a total amount of current per phase. For example, PhaseMap(5,1) returns a phase from the provider assigned to phase 1 for charging point 5.

The number of charging points and the rated current of each fuse may be variable parameters of the data model 110.

Figure 3:
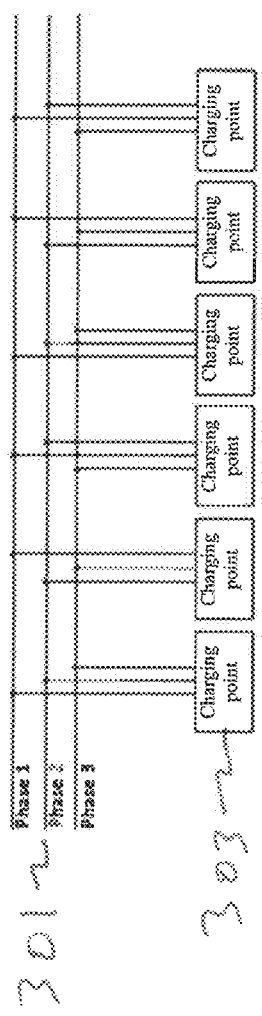
FIG. 3 shows an exemplary phase map.

FIG. 3 shows part of the phase map, i.e., a mapping of current phases received from the power provider to phases of charging points. In particular, incoming phases 301 from the power provider may be routed to individual charging points 303. Phases may be mapped differently at each charging point. For example, at a first charging point incoming phase 1 is mapped to phase 1 of the charging point, phase 2 is mapped to phase 2 and phase 3 is mapped to phase 3. At a second charging point, incoming phase 2 is mapped to phase 1 of the charging point, phase 3 is mapped to phase 2 and phase 1 is mapped to phase 3. At a third charging point, incoming phase 3 is mapped to phase 1 of the charging point, phase 1 is mapped to phase 2, and phase 2 is mapped to phase 3.

The mapping of the fourth charging point corresponds to the mapping of the first charging point and the fifth and sixth charging points correspond to the second and third charging points respectively. The rotation of phases may be used to minimize a load imbalance that can develop when charging single phase electric vehicles, such as the Nissan Leaf 2016 and the Mercedes GLC 350e. By charging single phase electric vehicles at charging points having different mappings, the load on phases of the electricity grid may be balanced more evenly.

Reducing load imbalances may reduce the cost of power and improve the stability of the electricity grid.

Figure 4:
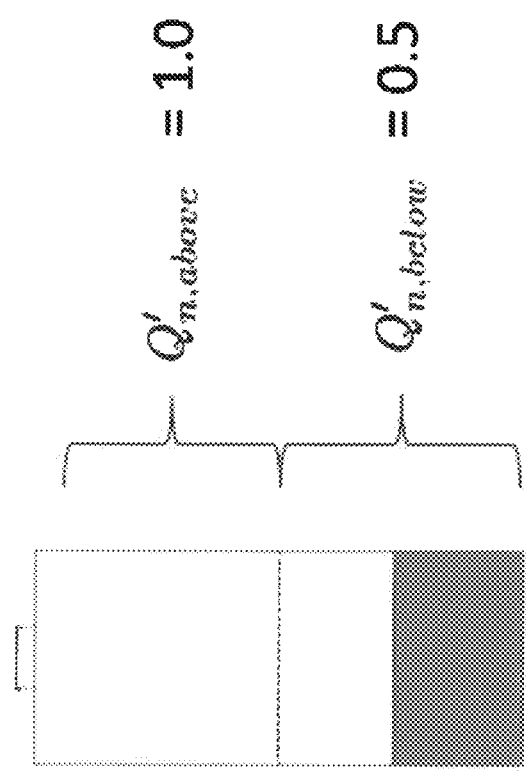
FIG. 4 shows elements of a fair share optimization component of an objective function for determining a charging schedule.

FIG. 4 shows parameters of the fair share component of the objective function. The fair share component is shown in equation (2) above. Terms of equation (2) are explained in more detail below.

The fair share component includes a $Q'_{n,below}$ term. $Q'_{n,below}$ is the relative difference between the current state of charge and the minimum state of charge. In the depicted example, $Q'_{n,below}$ is 0.5, indicating that the current state of charge is 0.25 and that the minimum state of charge is 0.5. Accordingly, the current state of charge is one half or 0.5 of the minimum state of charge as reflected in $Q'_{n,below}$. When the current state of charge of the vehicle reaches the minimum state of charge, $Q'_{n,below}$ has a value of zero. When the electric vehicle has no charge at all, $Q'_{n,below}$ has a value of 1. In the example, the maximum value of $Q'_{n,below}$ is 1. Other scales and/or maximum values may also be used.

$Q'_{n,above}$ is the difference between the maximum state of charge and the minimum state of charge. In the example of FIG. 4, $Q'_{n,above}$ is 1, indicating that the electric vehicle has no charge above the minimum state of charge. Any charge of the vehicle above the minimum state of charge would be reflected in a reduction of $Q'_{n,above}$. In this example, the maximum value of $Q'_{n,above}$ is 1. Other scales and/or maximum values may also be used.

The weight c in the fair share component of equation (2) may have a value between 0.05 and 0.2, more particularly, 0.1. The weight c may be used to reduce the importance of $Q'_{n,above}$, reflecting a priority of bringing vehicles to a minimum state of charge before increasing the charge of a vehicle above the minimum state of charge for the vehicle.

Equations (23) to (26) are constraints that may be used as part of the data model 110 in order to maximize the fair share component.

$$Q'_{n,below} \geq 1 - \left( \frac{\sum_i Q_{i,k,n} + b''_n}{b'_n} + M*(1 - U'_{k,n}) \right) \quad (23)$$

$$Q'_{n,below} \geq -M * U'_{k,n} \quad (24)$$

Equations (23) and (24) describe the difference between the current SoC of vehicle n and the minimum SoC of vehicle n.

$$Q'_{n,above} \geq 1 - \left( \frac{\sum_i Q_{i,k,n} + b''_n - b'_n}{b_n - b'_n} + M * U'_{k,n} \right) \quad (25)$$

$$Q'_{n,above} \geq 1 - (0 + M * (1 - U'_{k,n})) \quad (26)$$

Equations (25) and (26) describe the amount of charge exceeding the minimum SoC of vehicle n.

Equations (27)-(34) define utility variables (i.e., variables that are not directly used in the objective function) for the fair share component and for one or more of the power constraints.

$$\sum_j \sum_{k<k'} 0.25 * w_n * d_{k,n} * I_{i,j,k} \geq Q_{i,k',n} - M * (1 - X_{i,n}) \quad (27)$$

$$\sum_j \sum_{k<k'} 0.25 * w_n * d_{k,n} * I_{i,j,k} \leq Q_{i,k',n} + M * (1 - X_{i,n}) \quad (28)$$

-continued $$Q_{i,k,n} \leq M * X_{i,n} \quad (29)$$

$$Q_{i,k,n} \geq -M * X_{i,n} \quad (30)$$

$$\frac{b_n - (\sum_i Q_{i,k,n} + b''_n)}{b_n} \leq U_{b,n} \quad (31)$$

$$U_{k,n} \leq \frac{b_n - (\sum_i Q_{i,k,n} + b''_n)}{b'_n} + 0.9999 \quad (32)$$

$$U'_{k,n} \geq \frac{b'_n - (\sum_i Q_{i,k,n} + b''_n)}{b'_n} \quad (33)$$

$$M * U'_{k,n} \leq \frac{b'_n - (\sum_i Q_{i,k,n} + b''_n)}{b'_n} + M \quad (34)$$

Equation (27) defines an upper bound for loaded current for vehicle n across all three phases, whereas equation (28) defines a lower bound for loaded current. Equations (29) and (30) define upper and lower bounds, respectively, for the charge of vehicles that are not assigned to charging points. Equations (31) and (32) provide lower and upper bounds, respectively, for describing whether vehicle n is below its maximum state of charge. Equations (33) and (34) provide upper and lower bounds, respectively, for describing whether vehicle n is below its minimum state of charge.

Figure 5:
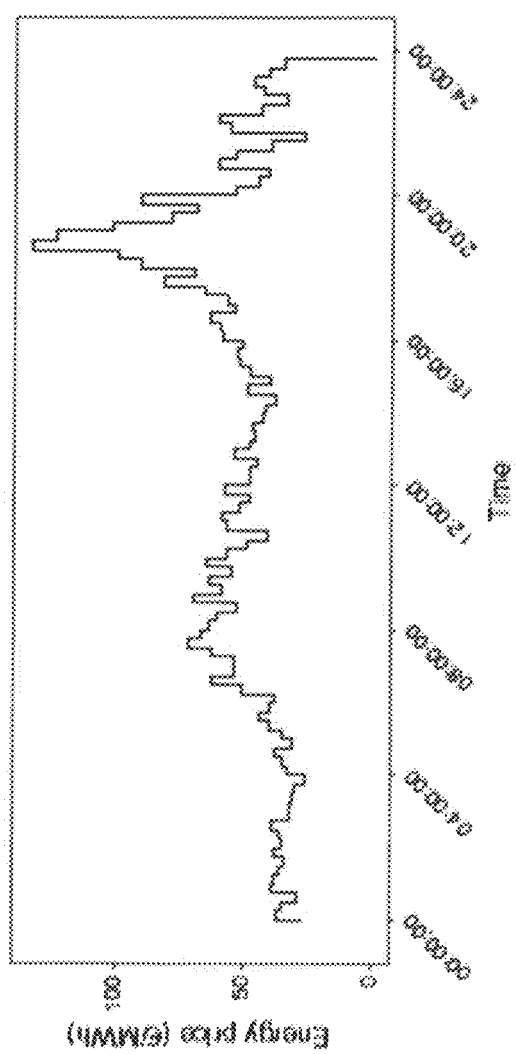
FIG. 5 shows an example of intraday power costs in €/MWh.

FIG. 5 shows intraday power costs for a typical weekday in Germany. Time is shown on the x-axis and energy price (i.e., power cost) in €/MWh is shown on the y-axis. A peak can be seen at around 18:30. In the example, the power prices can change at 15 minute intervals. Accordingly, the respective EV may be assigned to charge at the charge point for at least one 15 minute time interval. However, other time interval durations may also be used, depending on the intervals used by a different power provider (e.g., in France) or independent of the intervals used by the power provider.

Equation (35) may be used to define the difference in total current between two timeslots, i.e., timeslot k to timeslot k+1. $E_k^+$ and $E_k^-$ implement a technique to avoid use of an absolute value function, in the interest of efficient use of the solver 108. Since both $E_k^+$ and $E_k^-$ are minimized in equation (35), one will be 0 and the other will be $\geq 0$. The minimization of $E_k^+$ and $E_k^-$ leads to a minimization of the peak demand component (i.e., peak shaving) since the difference in total current from one timeslot to the next is minimized.

$$E_k^+ - E_k^- = \sum_{i,j} I_{i,j,k} - \sum_{i,j} I_{i,j,k+1} \quad (35)$$

Further constraints are provided below in equations (36)-(39).

$$I_{i,j,k} \leq c_{i,j} * \sum_n (X_{i,n} * d_{k,n}) \quad (36)$$

$$I_{i,j,k} \leq c_{i,j} \quad (37)$$

$$X_{i,n} \leq 1 - o_n + o''_i \quad (38)$$

$$X_{i,n} \leq 1 - o'_n + o'''_i \quad (39)$$

Equation (36) specifies whether vehicle n is at charging point i during timeslot k. Equation (37) describes a fuse for charging point i on phase j. Equation (38) specifies whether a BEV can be charged at charging point i and equation (39) specifies whether a PHEV can be charged at charging point i.

Power consumption costs may be based on the electricity prices, e.g., as depicted in the example of FIG. 5, and the amount of power used. In addition to power cost, there are also system usage fees, which factor into the cost of using the electric vehicle charging infrastructure.

System usage fees may reflect the power provider's efforts to meet varying demand for power. System usage fees may be determined by differences in power consumption over time or differences in power consumption across phases. Accordingly, minimizing peak demand or minimizing a load imbalance may minimize system usage fees, thereby having an effect on the overall cost of power.

For FIGS. 6 to 10, exemplary weights for objective function components are $w_1=10^{12}$ (fair share), $w_2=10^0$ (power cost) and $w_4=10^{-3}$ (load imbalance), whereas peak demand (sometimes shown as peak shaving) is disregarded by setting $w_3=0$. The weights are applicable unless otherwise indicated.

Figure 6:
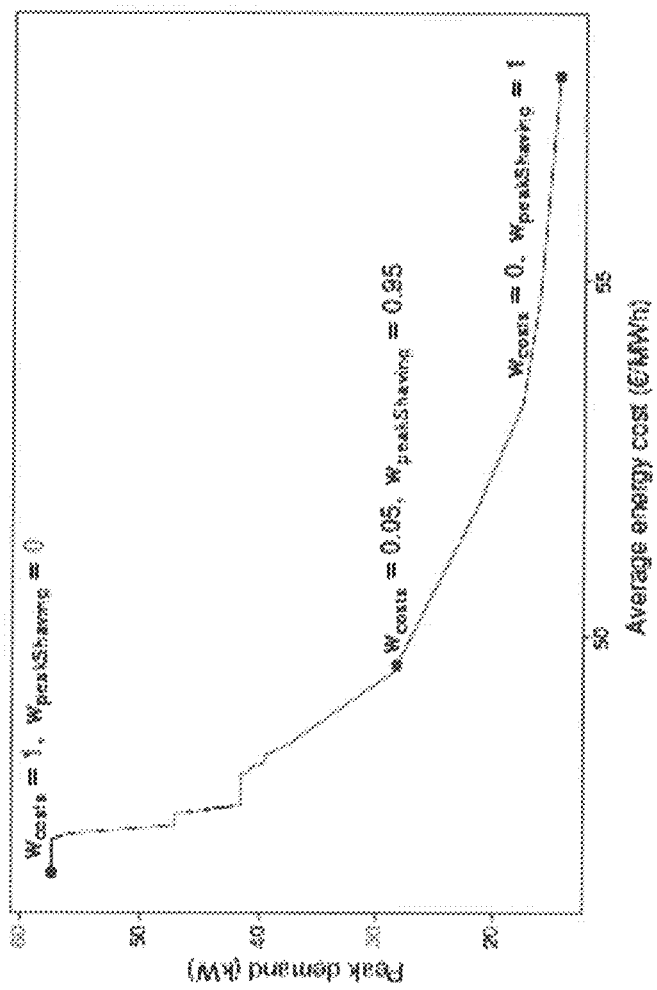
FIG. 6 shows a relationship between peak demand and power cost.

FIG. 6 shows simulation results depicting a tradeoff between weights for power costs ($w_{costs}$) and weights for peak demand ($w_{peakShaving}$). In this case, results are shown for 25 electric vehicles and 25 charging points. The weight for power cost is given as $w_2$ in the objective function of equation (1) and the weight for peak demand is given as $w_3$ in the objective function of equation (1). In view of this relationship, it may be desirable to disregard peak demand in the interest of reducing power costs.

In the context of FIG. 6, $w_1$ is kept constant at $10^{12}$, $w_3$ is kept constant at 0, $w_2 \in \{1.00, 0.99, \ldots, 0.00\}$ and $w_3 \in \{0.00, 0.01, \ldots, 1.00\}$.

An advantage of the data model 110 is that the weights $w_1$-$w_4$ may be set differently depending on the available electric charging infrastructure, the stability of the electrical grid and other considerations (e.g., other demands on the grid). It may be desirable to prioritize fair share over the other three components (power cost, peak demand, and load imbalance) in order to avoid a situation in which the optimal solution is not to charge any electric vehicles.

Fair share may correspond to the mean minimum state of charge that is required for the electric vehicles to reach their destinations (e.g., next charging point). It may be desirable to maximize fair share, e.g., in order to ensure that as many vehicles reach their destinations as possible. In the example of FIG. 6, average energy cost in €/MWh is plotted on the x-axis and peak demand in kW is plotted on the y-axis.

Figure 7:
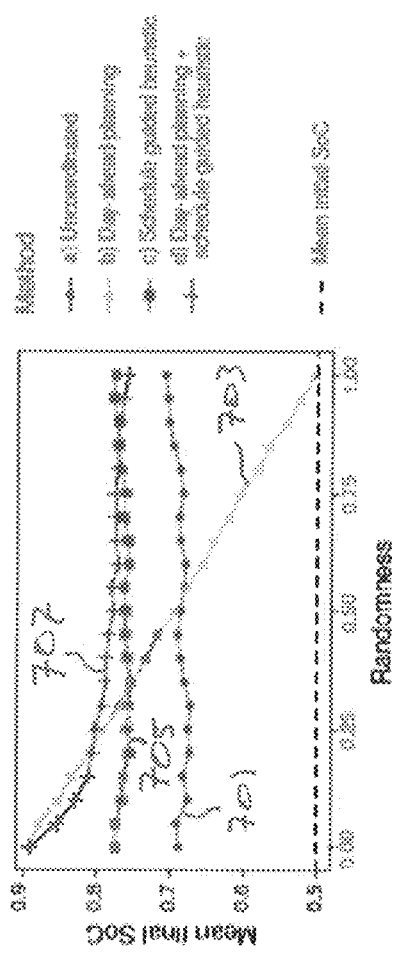
FIG. 7 shows an influence of randomization on a mean final state of charge.
Figure 8:
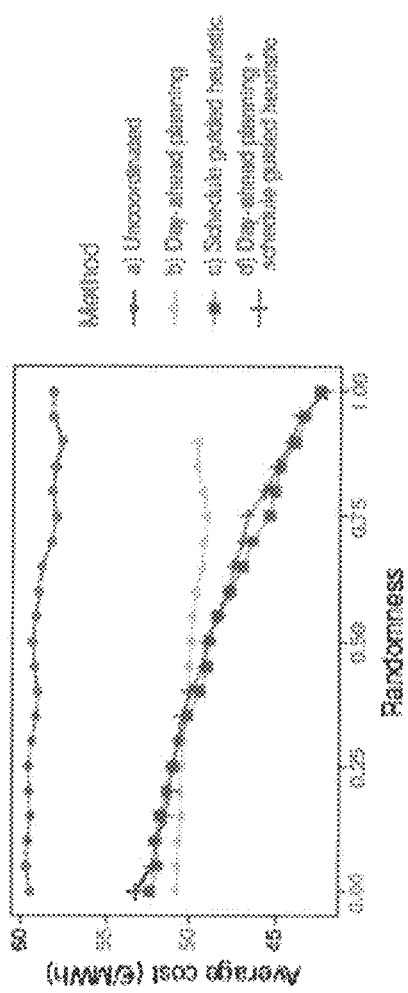
FIG. 8 shows an influence of randomization on an average power cost.

Table 2 lists approaches shown in FIGS. 7 and 8 and referred to in tables 3 and 4.

TABLE 2

| Label | Approach |
| --- | --- |
| a) | No day-ahead planning and uncoordinated charging: a first come first served approach |
| b) | Day-ahead planning: a simple algorithm tries to follow schedules from day-ahead planning exactly. If an EV is not in the dataset for day-ahead planning, it is not scheduled. Performance decreases in proportion to randomness. |
| c) | No day-ahead planning and the schedule guided heuristic: performance of |

TABLE 2-continued

| Label | Approach |
| --- | --- |
|  | the heuristic without any day-ahead planning. EVs are assigned to charging points on a first come first served basis. |
| d) | Day-ahead planning and the schedule guided heuristic: EVs are assigned to charging points by day-ahead planning and schedules are precomputed. |

FIG. 7 shows a simulation of the method for controlling electric vehicle charging infrastructure that is used by a plurality of electric vehicles. A mean final state of charge is shown on the y-axis and a degree of randomness is shown on the x-axis. The degree of randomness represents the proportion of unplanned electric vehicles, i.e., the proportion of electric vehicles for which corresponding schedule information was not received.

A line 701 shows a mean final state of charge according to the uncoordinated approach of table 2. According to the uncoordinated approach, no day-ahead planning is performed and charging is not regulated. Accordingly, a first come, first served approach is used to charge the vehicles. A line 703 shows results of the day-ahead planning approach of table 2. Accordingly, all vehicles are charged according to corresponding schedule information received for each vehicle. If an electric vehicle does not have corresponding schedule information, the electric vehicle is not scheduled to be charged. Thus, the mean final state of charge (i.e., average of each electric vehicle's fraction of the total state of charge reached) decreases in proportion to randomness.

A line 705 shows results of no day-ahead planning and the schedule guided heuristic 122, i.e., label c) in table 2. The schedule guided heuristic is described in more detail in the context of FIG. 11. Performance of the schedule guided heuristic without any day-ahead planning is shown. Electric vehicles are assigned to charging points on a first come, first served basis. For very high proportions of unplanned electric vehicles (i.e., schedule information is not received for a large number of the electric vehicles relative to the vehicles for which schedule information is received) the schedule guided heuristic 122 by itself performs best, since all charging points are free of blocking reservations.

A line 707 shows day-ahead planning combined with the schedule guided heuristic 122. Electric vehicles are assigned to charging points according to day-ahead planning and the charging schedule is determined before the electric vehicles arrive. The day-ahead planning plus scheduled guided heuristic performs best in most situations, unless randomness is very high (above 0.9) or low (below 0.4).

Table 3 shows results from the different depicted approaches and the exemplary component weights mentioned above. As shown in table 3, with increasing randomness, the performance of day-ahead planning in isolation predictably decreases, since electric vehicles for which no scheduling information is received are not scheduled. There is no benefit to using day-ahead planning with randomness 1 (i.e., no schedule information is received). Real time planning in isolation shows similar performance in state of charge with large differences in average power cost, independent of randomness. The combination of day-ahead planning and the scheduled guided heuristic shows best results at an increased load imbalance. For randomness of one, the combined approach of the scheduled guided heuristic and day-ahead planning shows slightly worse performance in comparison to relying solely on the scheduled guided heuristic. Because power cost minimization is chosen as a secondary objective having greater priority than peak demand, the maximum consumption $P_{max}$ is similar in all cases.

TABLE 3

| Approach | Power charged (kWh) | Cost $\left(\frac{€}{MWh}\right)$ | Mean min SoC | Mean final SoC | $P_{max}$ (kW) | Mean $I_N$ (A) |
|---|---|---|---|---|---|---|
| Randomness = 0.00 | | | | | | |
| a) | 326.9 | 59.39 | 0.83 | 0.68 | 23.17 | 8.107 |
| b) | 720.0 | 50.33 | 0.99 | 0.88 | 25.84 | 9.962 |
| c) | 514.7 | 52.12 | 0.89 | 0.76 | 23.22 | 13.318 |
| d) | 722.9 | 52.73 | 0.99 | 0.88 | 24.16 | 14.307 |
| Randomness = 0.20 | | | | | | |
| a) | 324.1 | 59.06 | 0.81 | 0.65 | 23.37 | 7.261 |
| b) | 548.2 | 50.42 | 0.93 | 0.79 | 23.48 | 11.373 |
| c) | 469.1 | 50.87 | 0.87 | 0.73 | 23.81 | 12.297 |
| d) | 554.7 | 50.90 | 0.90 | 0.78 | 23.46 | 14.998 |
| Randomness = 0.40 | | | | | | |
| a) | 322.5 | 57.94 | 0.83 | 0.68 | 22.95 | 7.474 |
| b) | 427.3 | 50.12 | 0.89 | 0.72 | 20.16 | 10.249 |
| c) | 458.9 | 48.51 | 0.87 | 0.74 | 23.48 | 9.608 |
| d) | 500.8 | 49.34 | 0.89 | 0.77 | 23.54 | 12.375 |
| Randomness = 0.60 | | | | | | |
| a) | 329.8 | 57.68 | 0.82 | 0.66 | 23.91 | 7.064 |
| b) | 284.7 | 49.72 | 0.83 | 0.65 | 16.20 | 8.305 |
| c) | 483.9 | 47.03 | 0.87 | 0.74 | 23.30 | 9.834 |
| d) | 488.8 | 46.74 | 0.88 | 0.76 | 23.33 | 11.345 |
| Randomness = 0.80 | | | | | | |
| a) | 332.1 | 57.06 | 0.82 | 0.67 | 23.67 | 7.942 |
| b) | 166.5 | 49.36 | 0.78 | 0.57 | 11.28 | 7.206 |
| c) | 491.5 | 44.23 | 0.87 | 0.75 | 22.72 | 11.016 |
| d) | 485.1 | 44.70 | 0.87 | 0.74 | 23.40 | 12.277 |
| Randomness = 1.00 | | | | | | |
| a) | 328.6 | 56.91 | 0.85 | 0.69 | 22.98 | 8.636 |
| b) | 0.0 | | 0.74 | 0.50 | 0.00 | 0.000 |
| c) | 460.9 | 40.46 | 0.89 | 0.76 | 23.39 | 10.573 |
| d) | 429.9 | 41.16 | 0.87 | 0.74 | 23.25 | 9.707 |

FIG. 8 shows the average cost in €/MWh in situations of increasing randomness for each of the approaches described above (uncoordinated, day-ahead planning, the schedule guided heuristic 122, day-ahead planning plus the schedule guided heuristic 122).

Figure 9:
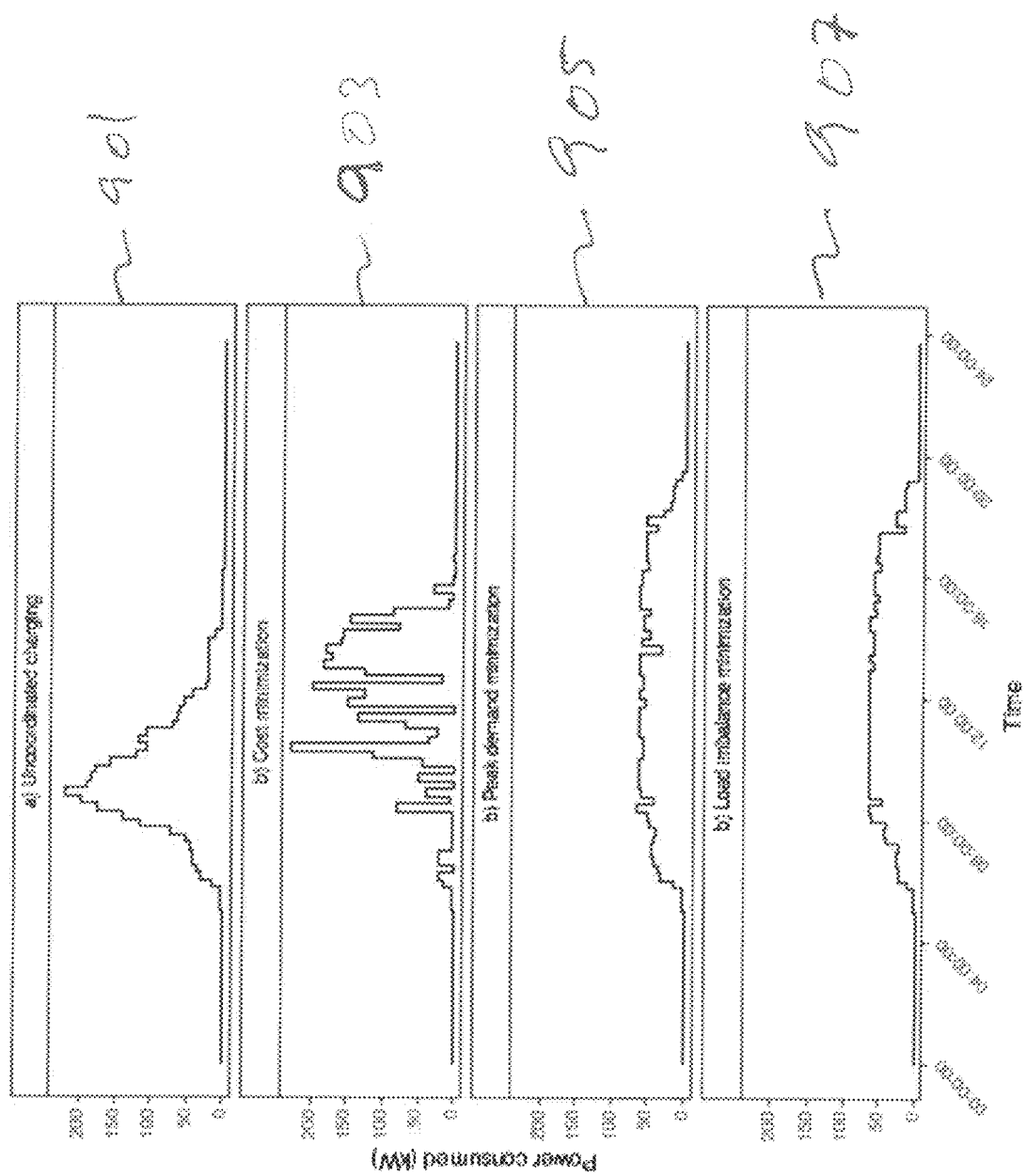
FIG. 9 shows power consumption over time resulting from different weights being assigned to different optimization components of the objective function.

FIG. 9 shows power consumption over time in view of different weight settings for the objective function components. A first chart 901 shows electric vehicle power consumption over time with the uncoordinated charging of table 2. Chart 903 shows a result of prioritizing cost minimization over load imbalance and peak demand. In this case, a resulting cost is 46.69 €/MWh and the resulting power used is 57.48 kW (see table 4 below). Chart 905 shows results of prioritizing peak demand minimization over cost minimization and load imbalance. In this case, the cost of power is 57.60 €/MWh and the peak power demand during the day is 16.31 kW. Accordingly, the cost minimization depicted in chart 903 minimizes the power cost while the peak demand minimization depicted in chart 905 minimizes differences in power consumption across time intervals.

Chart 907 shows results of prioritizing load imbalance minimization over cost minimization and peak demand minimization.

Table 4 shows results of different weights in the objective function in comparison to uncoordinated charging.

TABLE 4

| Approach | Power charged (kWh) | Cost $\left(\frac{€}{MWh}\right)$ | Mean min SoC | Mean final SoC | $P_{max}$ (kW) | Mean $I_N$ (A) |
|---|---|---|---|---|---|---|
| Uncoordinated | | | | | | |
| a) | 717.7 | 57.52 | 0.98 | 0.97 | 55.54 | 13.6 |
| Cost minimization ($w_1 = 10^{12}$, $w_2 = 10^0$, $w_3 = 0$, $w_4 = 10^{-3}$) | | | | | | |
| b) | 697.5 | 46.69 | 0.98 | 0.94 | 57.48 | 10.7 |
| Peak demand minimization ($w_1 = 10^{12}$, $w_2 = 0$, $w_3 = 10^0$, $w_4 = 10^{-2}$) | | | | | | |
| b) | 683.9 | 57.60 | 0.98 | 0.93 | 16.31 | 12.7 |
| Load imbalance minimization ($w_1 = 10^{12}$, $w_2 = 0$, $w_3 = 10^{-6}$, $w_4 = 10^0$) | | | | | | |
| b) | 681.9 | 56.65 | 0.98 | 0.92 | 16.52 | 4.7 |

As can be seen, when cost minimization is emphasized over peak demand and load imbalance, only 697.5 kWh of power is used at a cost of 46.69 €/MWh, in comparison to 717.7 kWh and 57.52 €/MWh in the case of uncoordinated charging.

In the simulation discussed in FIG. 9, 50 cars and 25 charging points were used with no randomness, i.e., schedule information was received for all arriving electric vehicles. As shown in table 4 above, weight settings for cost minimization show the lowest average cost (46.69 €/MWh) while peak demand shows the lowest peak power demand during the day (16.31 kW). Weight settings for load imbalance minimization shows the lowest average load imbalance IN.

Figure 10:
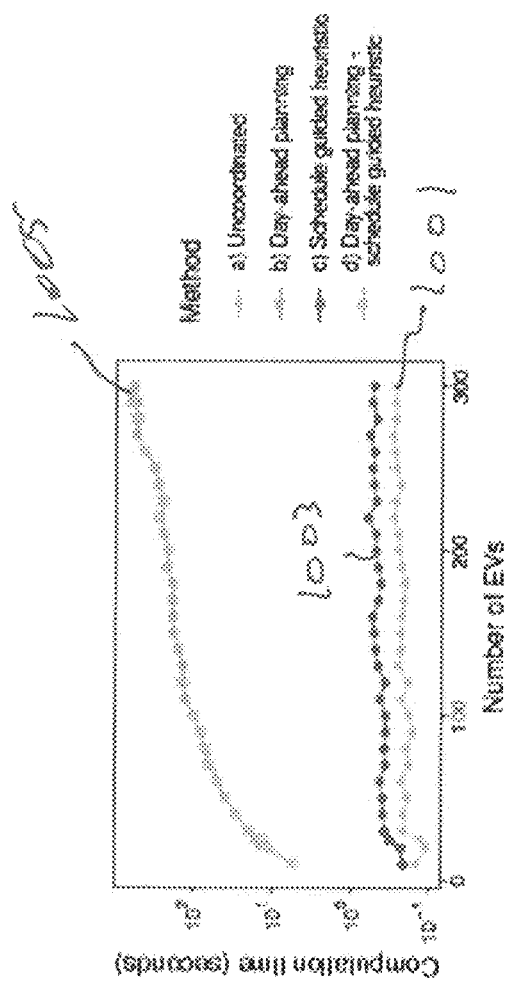
FIG. 10 shows computation time required for various approaches for controlling electric vehicle charging infrastructure.

FIG. 10 shows a computation time per approach of table 2, subject to the number of electric vehicles. The number of charging points is held constant at 25. Uncoordinated charging is included as a bench mark. Computation time is plotted on the y-axis and the number of electric vehicles is plotted on the x-axis. Computation times for uncoordinated charging are shown at 1001, computation times for the schedule-guided heuristic are shown at 1003 and computation times for day-ahead planning and day-ahead planning plus the schedule-guided heuristic are shown at 1005. As shown, the schedule-guided heuristic in isolation is several orders of magnitude faster than an optimal approach that does not involve the use of heuristics. Moreover, an optimal approach without heuristics might be infeasible in a practical setting, especially because the model size further increases with the number of charging points and electric vehicles.

Figure 11:
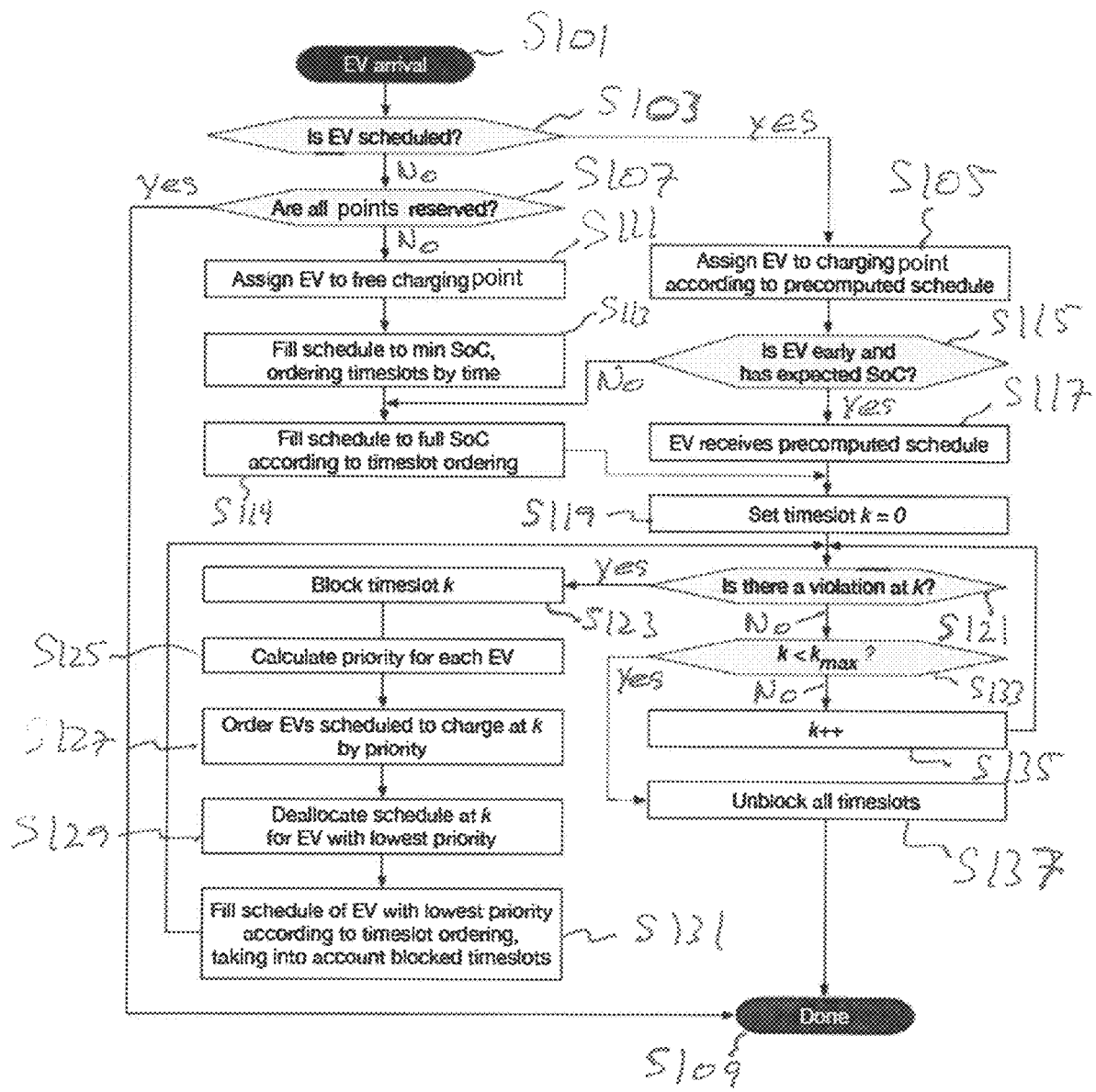
FIG. 11 shows charging point assignment and possible rescheduling carried out upon arrival of an electric vehicle.

FIG. 11 shows an implementation of a scheduling heuristic to be applied upon receipt of an arrival indication for a respective electric vehicle. The scheduling heuristic may be applied after a charging schedule (also referred to as a precomputed schedule) for a plurality of electric vehicles has been determined. Further, the scheduling heuristic may be used to determine which charging point of the electric vehicle charging infrastructure to assign the respective electric vehicle (i.e., one of the plurality of electric vehicles) for at least one time interval.

In some cases, it is not necessary to carry out all the steps depicted in FIG. 11. For example, steps S121 to S137 could be omitted, e.g., in cases where an error condition is not foreseen. More specifically, if the electrical safety devices of the electric vehicle charging infrastructure could support all vehicles charging at the same time, then steps S121-S137 would not be necessary.

At step S101, an arrival indication for the respective electric vehicle is received. At step S103, a determination is made as to whether vehicle availability for the respective electric vehicle was received. When vehicle availability for the respective electric vehicle was received and the arrival indication is reflected in the vehicle availability, at step S105, the respective electric vehicle may be assigned to one of the charging points for the time interval in the charging schedule. The charging schedule may contain multiple time intervals for the electric vehicle. The time intervals may be non-contiguous (e.g., 9:00 to 10:15 and 13:15 to 14:15).

When vehicle availability for the respective electric vehicle was not received or the arrival indication does not correspond to the vehicle availability, determining whether one of the charging points is available may be carried out at step S107 for at least one open time interval. A charging point is available if there is no electric vehicle currently charging there or if an electric vehicle in the charging schedule is late by at least a specified time (e.g., one or more time intervals). The arrival indication might not correspond to the vehicle availability when the vehicle is late by the specified time. If no charging points are available (i.e., all points are reserved), then the method ends at step S109. If one of the charging points is available, then the respective electric vehicle is assigned to the available charging point at S111 for the open time interval.

The schedule heuristic shown in FIG. 11 may consider situations in which electric vehicles do not arrive according to the received vehicle availability or do not arrive at all. The scheduling heuristic may reflect an approach to smart charging that considers different types of planning: day-ahead (or offline) and real-time (or online). Day-ahead planning (see table 2) may be carried out in view of the determined (pre-computed) charging schedule. Real time or online scheduling may reflect real life deviations from the determined charging schedule.

In addition to vehicle availability, the schedule information may include vehicle model, planned arrival time, planned departure time and a current state of charge. Some of this information may be estimated or dispensed with. For example, the departure time and the state of charge may be estimated according to historical information, as described above.

According to the approach shown in FIG. 11, the determined charging schedule may be adapted in real time as arrival indications for respective electric vehicles are received. In addition, the charging schedule may be adapted as electric vehicles depart (e.g., the charging intervals scheduled for departed vehicles can be reassigned to remaining vehicles).

As discussed in more detail below, the components of the objective function discussed above may be reused for prioritization in the context of rescheduling.

Electric vehicles may be assigned to charging points under two conditions: If they are present in the determined schedule or if there are charging points available (i.e., not reserved). Charging point availability is determined as discussed in step S107. At step S113 one or more time intervals may be assigned to the respective electric vehicle for charging. The respective electric vehicle may be assigned the earliest possible time interval so as to reach a minimum state of charge as soon as possible. If further time intervals in the schedule are available, the respective electric vehicle may be scheduled to be charged to its corresponding maximum state of charge at step S114.

At step S115, a determination is made if an electric vehicle in the charging schedule has arrived early (or on time) and has its expected state of charge. If not (e.g., if the vehicle arrives early but has less than its expected state of charge), the electric vehicle is scheduled to receive the maximum state charge at step S114; in this case, the vehicle is not charged according to the determined charging schedule since the vehicle needs more charge than expected. If so, then step S117 is carried out. At step S117, the respective electric vehicle is assigned to charge at one of the charging points for the time interval specified in the charging schedule.

Steps S113 and S114 may include filling or adapting the charging schedule according to a greedy filling technique.

The following example relates to steps S114, S115 and S117. At step S115 vehicle A may have a planned arrival of 09:00, and an actual arrival of 08:55. In addition vehicle A may have an expected current SoC of 0.5 (i.e., ½ the minimum SoC), and an actual current SoC of 0.5. Vehicle B may have a planned arrival 09:00 and an actual arrival 08:55. Further, vehicle B may have an expected current SoC of 0.5 and an actual current SoC of 0.3 (i.e., 3/10 of the minimum SoC). For vehicle A, the method continues to step S117, since vehicle A has the expected current state of charge and can reach its maximum state of charge according to the charging schedule. For vehicle B, the method continues to step S114, since vehicle B does not have its expected current state of charge and might need more time than what is allotted to reach its maximum state of charge.

Before assigning the respective electric vehicle to charge at one of the charging points for the time interval, it may be desirable to check the charging schedule for error conditions (i.e., violations). Error conditions may arise for the time interval at which the respective electric vehicle is scheduled to be charged or in the future. An example of an error condition is when the sum of electric current amounts scheduled to be supplied at a given time exceeds the rated current for one of the fuses for the charging point that the respective vehicle is assigned to depends on. In other words, the error condition may occur when a fuse in the fuse tree is overloaded. The following steps may be used for avoiding error conditions in the charging schedule. As noted above, these steps may be omitted if error conditions are not foreseen.

At step S119 the timeslot k may be set to zero. This may be done in order to go through all timeslots in the charging schedule in order to make sure that no timeslot (i.e., time interval) has an error condition. At step S121, it may be determined whether there is an error condition at time interval k. If there is an error condition at time interval k, then time interval k is blocked at step S123. Blocking time interval k may involve preventing a vehicle from being rescheduled to time interval k. In order to determine which vehicle is to be rescheduled, a priority may be calculated for each electric vehicle at S125. Accordingly, in view of the priority determination, it may be that the vehicle that caused the error condition is not the vehicle that is rescheduled but another vehicle with a lower priority.

If no departure time for the electric vehicle is known, a departure time may be estimated from a historical median departure time, e.g., 17:15 in the evening. Other approaches, e.g., forecasting, may also be used. A flexible priority function with four weighted components may be used to calculate the priority for each electric vehicle. The components of the priority function may correspond to the components of the objective function (obj. func. components).

Rescheduling may be determined as shown in table 5:

TABLE 5

| Obj. Func. Component | EV priority at timeslot k | Timeslot priority |
|---|---|---|
| Fair share | Current SoC | Order by time |
| Cost | Cost of schedule at k | Order by timeslot cost |
| Peak demand | Schedule at k | Order by sum of schedules |
| Load imbalance | Effect on $I_N$ at k | Order by $I_N$ per timeslot |

Table 5 shows flexible function components for electric vehicle priority and time interval ordering. In other words, table 5 reflects a way that the schedule guided heuristic may implement the four components of the objective function in the context of rescheduling.

The "EV priority at timeslot k" column shows a basis for determining rescheduling priority in view of a corresponding objective function component in the "Obj. Func. Component" column.

The "Timeslot priority" column is used once EV priority has been determined and for step S114 (discussed above). Timeslots are then ordered by the corresponding component and a timeslot with the lowest priority is selected at S129, as discussed below.

In some implementations, forecasting of the departure time of the electric vehicles could be used to improve prioritization (i.e., calculation of priority).

In equations (40)-(45), most variables are defined as usual (see the list at the end of the description). For convenience, M is a large number (e.g., $10^5$ or another number consistent with the Big M method). k is a timeslot having a specified duration (e.g., 15 minutes), t is the continuous time in seconds, $I_{i,j,k}$ is the current for a charging station ion phase j during timeslot k.

Further, in equations (40)-(45), $I_{i,j,k}$ is abbreviated as $I_{n,t}$ (amount of current for vehicle n during time t), and $f_n$ is the maximum current available for vehicle n.

Equation (40) shows the priority per electric vehicle for the fair share objective function component. For this component, the goal is to minimize the number of electric vehicles below their minimum state of charge (SoC). To prioritize those vehicles leaving earlier, Δt reflects vehicle availability, which in this case is the remaining time that the electric vehicle will be available for charging.

$$\text{priority}_1(n, t) = \begin{cases} \dfrac{SoC_{min} - SoC_t}{|\Delta t| * f_n + \epsilon}, & \text{if } SoC_t < SoC_{min} \\ \dfrac{SoC_{max} - SoC_t}{|\Delta t| * f_n + \epsilon} - M, & \text{otherwise} \end{cases} \quad (40)$$

The priority with respect to power cost is calculated in equation (41) by the average power cost (€/MWh) in the electric vehicle's schedule:

$$\text{priority}_2(n, t) = -\left(\frac{1}{t_{max}} \sum_{t=1}^{t_{max}} c_t * I_{n,t}\right) \quad (41)$$

To minimize peak demand, the planned charging current for electric vehicle n at time t in the charging schedule determines the priority of vehicle n. Accordingly, minimizing peak demand would cause the electric vehicle with the highest planned current to be rescheduled, as shown in equation (42):

$$\text{priority}_3(n, t) = -I_{n,t} \quad (42)$$

For quantifying the load imbalance in a three phase system (e.g., with four wires) various approaches may be used. In three phase systems, total current across phases can be expressed as the combination of three separate currents and associated phase angles, with a pairwise offset of 360 degrees divided by 3=120 degrees. Each such current $I_j$ for one phase can be represented by a polar vector with magnitude $|I_j|$ and angle $\phi_j \in \{0°, 120°, 240°\}$.

A simplifying assumption may be made. For example, it may be assumed that the network has a constant voltage and a vector approximation which calculates the neutral current $I_n$ as the sum of three polar vectors may be used as shown in equation (43):

$$|I_N| = |I_1 + I_2 + I_3| \quad (43)$$

$$|I_N| = \text{sqrt}((|I_1|*\cos\phi_1 + |I_2|*\cos\phi_2 + |I_3|*\cos\phi_3)^2 + (|I_1|*\sin\phi_1 + |I_2|*\sin\phi_2 + |I_3|*\sin\phi_3)^2) \quad (44)$$

Equation (44) represents a corresponding explicit form for computation where variables $|I_j|$ of equation (43) are replaced with the measured currents per phase. To derive equation (44) from equation (43), the Pythagoras theorem can be applied after a projection of the individual phase current vectors into two-dimensional Cartesian coordinates is carried out.

When minimizing load imbalance, electric vehicle priority is calculated by determining the average load imbalance that the electric vehicles power demand is causing. This is calculated in equation (45), where $I_N(n,t)$ is the load imbalance at time t with vehicle n charging and $I'_N(n,t)$ without vehicle n charging at time t. In other words, equation (45) quantifies the extent to which the load imbalance would change if car n were to be rescheduled. For EVs able to charge on three phases equation (45) returns zero, since they do not cause load imbalance among the three phases:

$$\text{priority}_4(n,t) = I'_N(n,t) - I_N(n,t) \quad (45)$$

After calculating the priority for each of the electric vehicles, the electric vehicles scheduled to charge at timeslot k may be ordered by priority at step S127. At step S129, the vehicle with the lowest priority may be removed or deallocated from the schedule. At step S131, the vehicle removed from the schedule may be reinserted into the schedule according to a timeslot ordering, taking blocked timeslots into account (i.e., the vehicle is not rescheduled to a blocked timeslot). In particular, the vehicle to be rescheduled may be rescheduled at the earliest possible time. The rescheduling may result in a reduced optimization of at least one of the optimization components of the objective function. For example, the rescheduling may result in an increased cost of power in comparison to the original schedule.

At step S133, a determination may be made as to whether k is less than $k_{max}$. $k_{max}$ may be the final interval in the charging schedule (e.g., the last charging time interval at the end of a work day), such that all time intervals are checked for an error condition.

If k is less than $k_{max}$, then k is incremented at step S135 and the process repeats from step S121, as described above. If k is not less than $k_{max}$, then all timeslots are unblocked at step S137 and the process ends at step S109.

The subject matter disclosed herein relates to a publicly funded project sponsored by the German Federal Ministry for Economic Affairs and Energy.

LIST OF ABBREVIATIONS AND VARIABLES

Abbreviations

EV electric vehicle
BEV battery electric vehicle
PHEV plug-in hybrid electric vehicle
MIP mixed integer programming
SoC state of charge
$SOC_{min}$ minimum state of charge
$SOC_{max}$ maximum state of charge
$SoC_t$ state of charge at time t
Ah ampere hours (or amp hours)
A amps Indices

| | |
|---|---|
| i | Charging point |
| j | Phase |
| k | timeslot |
| l | Pre-fuse |
| n | vehicle |

Decision Variables

| | |
|---|---|
| $I_{i,j,k} \in \mathbb{R}$ | Charging current |
| $X_{i,n} \in \{0, 1\}$ | Vehicle assignment |

Utility Variables (not Directly Used in Objective Function)

| | |
|---|---|
| $D_k^+, D_k^- \in \mathbb{R}$ | Load imbalance differences |
| $E_k^+, E_k^- \in \mathbb{R}$ | Deviation of total current from previous timeslot |
| $Q_{i,k,n} \in \mathbb{R}^+$ | Sum previously loaded |
| $Q'_{n,below} \in \mathbb{R}$ | $0 \leq Q'_{n,below} \leq 1$ % min SoC at timeslot $k = k_{max}$ |
| $Q'_{n,above} \in \mathbb{R}$ | $0 \leq Q'_{n,above} \leq 1$ % above min SoC at $k = k_{max}$ |
| $U_{k,n} \in \{0, 1\}$ | Is vehicle n below max SoC at k? |
| $U'_{k,n} \in \{0, 1\}$ | Is vehicle n below b'n at k? |
| $V_{k,n} \in \{0, 1\}$ | Is vehicle n I > $g_{j,n}$ or exactly 0 at k? |

Parameters

| | |
|---|---|
| $a_{j,n} \in \mathbb{R}$, | $0 \leq a_{j,n} \leq 1$ and $a_{1,n} \geq a_{2,n} \geq a_{3,n}$, portion that vehicle n charges on phase j |
| $b_n \in \mathbb{R}, b_n \geq 0$ | Charging needed to reach $SoC_{max}$ for car n (in Ah) |
| $b'_n \in \mathbb{R}, b'_n \geq 0$ | Charging needed to reach $SoC_{min}$ for car n (in Ah) |
| $b''_n \in \mathbb{R}, b''_n \geq 0$ | Starting SoC for vehicle n (in Ah) |
| $c_k \in \mathbb{R}$ | Power cost for timeslot k (in €/MWh) |
| $d_{k,n} \in \{0, 1\}$ | Is vehicle n available at timeslot k? |
| $e_{i,j} \in \mathbb{R}, e_{i,j} \geq 0$ | Fuse at charging point i on phase j (in A) |
| $f_{j,n} \in \mathbb{R}, f_{j,n} \geq 0$ | Maximum current for vehicle n on phase j (in A) |
| $g_{j,n} \in \mathbb{R}, g_{j,n} \geq 0$ | Minimum current for vehicle n on phase j (in A) |
| $h_{l,j} \in \mathbb{R}, h_{l,j} \geq 0$ | Pre-fuse/on phase j (in A) |
| $M = 10^5$ | Constant value of M for the Big M method |
| $o_n \in \{0, 1\}$ | Is vehicle n a BEV? |
| $o'_n \in \{0, 1\}$ | Is vehicle n a PHEV? |
| $o''_n \in \{0, 1\}$ | Can BEVs be charged at charging point i? |
| $o'''_n \in \{0, 1\}$ | Can PHEVs be charged at charging point i? |
| $r_n \in \{0, 1\}$ | Must vehicle n start charging upon arrival? |
| $s_n \in \{0, 1\}$ | Can charging for vehicle n be suspended? |
| $t_n \in \{0, 1\}$ | Can vehicle n be charged with variable current? |
| $w_n \in \mathbb{R}$ | $0 \leq w_n \leq 1$, charging efficiency of vehicle n |
| $PhaseMap_{i,j} \in$ | Describes relationship between grid |
| $\{0, 1, 2\}$ | and charging point phase; Map for point i from j (point phase) to j' (grid phase) |

What is claimed is:

1. A computer-implemented method for controlling electric vehicle charging infrastructure that is used by a plurality of electric vehicles, the infrastructure comprising a plurality of charging points, the method comprising:
   receiving schedule information for the electric vehicles, the schedule information including, for each of the electric vehicles, at least one vehicle power characteristic;
   determining at least one power constraint for each of the electric vehicles based on the vehicle power characteristic;
   receiving an arrival indication for a respective one of the electric vehicles; and
   assigning the respective electric vehicle to charge at one of the charging points for at least one time interval according to the respective power constraint.

2. The method of claim 1, wherein the vehicle power characteristic includes at least one of the following: a vehicle model, an electric vehicle type, or an attribute specific to the corresponding electric vehicle.

3. The method of claim 2, when the schedule information also includes vehicle availability, the method further comprises:
   determining, before receiving the arrival indication, a charging schedule for each of the electric vehicles based on the vehicle availability;
   wherein the respective electric vehicle is assigned to charge at one of the charging points for the time interval based on the charging schedule.

4. The method of claim 3, when the schedule information does not include vehicle availability or the arrival indication does not correspond to the vehicle availability, the method further comprises:
   determining whether one of the charging points is available for at least one open time interval;
   when one of the charging points is available, assigning the respective electric vehicle to the available charging point for the open time interval.

5. The method of claim 4, wherein the respective electric vehicle is assigned to charge at one of the charging points based on optimization of an objective function, wherein the optimization may comprise one or more of the following:
   mixed integer programming,
   at least one inequality constraint,
   the big M method for using the simplex algorithm.

6. The method of claim 5, wherein the objective function has at least one of the following optimization components:
   a fair share component to minimize the number of electric vehicles below a corresponding minimum state of charge,
   a cost component to minimize a cost of power;
   a peak demand component to minimize differences in power consumption over time, wherein minimizing differences over time may include minimizing differences in power consumption across time intervals;
   a load imbalance component to minimize differences in power consumption across phases, wherein the load imbalance may be minimized according to a linear approximation.

7. The method of claim 1, wherein the at least one power constraint includes one or more electric current constraints, wherein for each one of the electric vehicles, the electric current constraints specify at least one the following:
an amount of current that can be supplied to the corresponding electric vehicle;
whether varying current can be supplied to the corresponding electric vehicle;
whether more than one phase of current can be supplied to the corresponding electric vehicle;
which phase of current the corresponding electric vehicle is capable of charging on.

8. The method of claim 7, wherein the electric current constraints specifying the amount of current that can be supplied to the corresponding electric vehicle include:
a maximum amount of current with which the electric vehicle can be charged, and/or
a minimum amount of current with which the electric vehicle can be charged, wherein the minimum amount of current is a single minimum value or a range of excluded values.

9. The method of claim 8, wherein the electric current constraints specify at least one of the following:
whether the corresponding electric vehicle will tolerate delayed charging, wherein delayed charging includes starting to charge the electric vehicle with 0 Amps of current,
whether the corresponding electric vehicle will tolerate suspended charging, wherein suspended charging includes providing no current to the electric vehicle after providing a current of greater than 0 Amps to the electric vehicle,
whether the corresponding electric vehicle will tolerate different levels of current while charging.

10. The method of claim 1, wherein the at least one power constraint includes an energy efficiency constraint, wherein the energy efficiency constraint may be determined based on an attribute specific to a corresponding one of the electric vehicles.

11. The method of claim 10, wherein the schedule information further includes an indication of a minimum state of charge,
wherein the indication of the minimum state of charge includes one or more of the following: a planned distance to travel, a vehicle battery capacity and at least one destination.

12. The method of claim 11,
wherein the minimum state of charge reflects a charge needed for the corresponding electric vehicle to safely reach a next charging point.

13. The method of claim 1, further comprising: determining, from the vehicle power characteristic, one or more of the following for each of the electric vehicles:
a time required to reach the minimum state of charge,
a maximum state of charge or vehicle charge capacity,
the electric vehicle type, and
a charging phase capability.

14. A non-transitory computer-readable medium storing processor-executable instructions, which, when loaded and executed on a computer system, cause the computer system to:
receive schedule information for the electric vehicles, the schedule information including, for each of the electric vehicles, at least one vehicle power characteristic;
determine at least one power constraint for each of the electric vehicles based on the vehicle power characteristic;
receive an arrival indication for a respective one of the electric vehicles; and
assign the respective electric vehicle to charge at one of the charging points for at least one time interval according to the respective power constraint.

15. The medium of claim 14, the instructions, which, when loaded and executed on a computer system, cause the computer system to:
determine, before reception of the arrival indication, a charging schedule for each of the electric vehicles based on the vehicle availability;
wherein the respective electric vehicle is assigned to charge at one of the charging points for the time interval based on the charging schedule.

16. The medium of claim 15, the instructions, which, when loaded and executed on a computer system, cause the computer system to:
determine whether one of the charging points is available for at least one open time interval;
when one of the charging points is available, assigning the respective electric vehicle to the available charging point for the open time interval.

17. The medium of claim 14, wherein the objective function has at least one of the following optimization components:
a fair share component to minimize the number of electric vehicles below a corresponding minimum state of charge,
a cost component to minimize a cost of power;
a peak demand component to minimize differences in power consumption over time, wherein minimizing differences over time may include minimizing differences in power consumption across time intervals;
a load imbalance component to minimize differences in power consumption across phases, wherein the load imbalance may be minimized according to a linear approximation.

18. A computer system for controlling electric vehicle charging infrastructure, the charging infrastructure for use by a plurality of electric vehicles, the infrastructure comprising a plurality of charging points, the system comprising:
at least one processor configured to:
receive schedule information for the electric vehicles, the schedule information including, for each of the electric vehicles, at least one vehicle power characteristic;
determine at least one power constraint for each of the electric vehicles based on the vehicle power characteristic;
receive an arrival indication for a respective one of the electric vehicles;
assign the respective electric vehicle to charge at one of the charging points for at least one time interval according to the respective power constraint.

19. The computer system according to claim 18, the at least one processor configured to:
determine, before reception of the arrival indication, a charging schedule for each of the electric vehicles based on the vehicle availability;
wherein the respective electric vehicle is assigned to charge at one of the charging points for the time interval based on the charging schedule.

20. The computer system according to claim 18, the at least one processor configured to:
determine whether one of the charging points is available for at least one open time interval;
when one of the charging points is available, assigning the respective electric vehicle to the available charging point for the open time interval.

* * * * *